United States Patent
Okita et al.

(10) Patent No.: US 7,940,863 B2
(45) Date of Patent: May 10, 2011

(54) RADIO RECEIVING APPARATUS AND RADIO RECEIVING METHOD

(75) Inventors: Atsushi Okita, Osaka (JP); Satoshi Sugino, Osaka (JP); Masanori Hayashi, Osaka (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 615 days.

(21) Appl. No.: 12/066,390

(22) PCT Filed: Sep. 26, 2006

(86) PCT No.: PCT/JP2006/319013
§ 371 (c)(1),
(2), (4) Date: Mar. 11, 2008

(87) PCT Pub. No.: WO2007/034956
PCT Pub. Date: Mar. 29, 2007

(65) Prior Publication Data
US 2009/0154526 A1    Jun. 18, 2009

(30) Foreign Application Priority Data

Sep. 26, 2005  (JP) .................. 2005-278271

(51) Int. Cl.
*H03K 9/00* (2006.01)
*H04L 27/00* (2006.01)
(52) U.S. Cl. ........................................ 375/316
(58) Field of Classification Search .................. 375/224, 375/285, 316, 340, 342, 346
See application file for complete search history.

(56) References Cited

U.S. PATENT DOCUMENTS

| | | | |
|---|---|---|---|
| 5,677,927 A | 10/1997 | Fullerton et al. | |
| 5,960,031 A | 9/1999 | Fullerton et al. | |
| 5,963,581 A | 10/1999 | Fullerton et al. | |
| 5,995,534 A | 11/1999 | Fullerton et al. | |
| 6,031,862 A | 2/2000 | Fullerton et al. | |
| 6,785,392 B1* | 8/2004 | Llewellyn | 381/120 |
| 6,834,073 B1* | 12/2004 | Miller et al. | 375/130 |
| 7,110,473 B2* | 9/2006 | Miller et al. | 375/316 |
| 7,200,361 B2* | 4/2007 | Onodera | 455/41.1 |
| 7,369,829 B2 | 5/2008 | Lee et al. | |
| 7,436,913 B2 | 10/2008 | Kang et al. | |
| 2004/0029610 A1 | 2/2004 | Ihira et al. | |
| 2005/0031043 A1 | 2/2005 | Paquelet | |

(Continued)

FOREIGN PATENT DOCUMENTS

EP    1503513    2/2005

(Continued)

OTHER PUBLICATIONS

English language Abstract of KR 2005-0019943, Mar. 4, 2005.

(Continued)

*Primary Examiner* — Jean B Corrielus
(74) *Attorney, Agent, or Firm* — Greenblum & Bernstein, P.L.C.

(57) ABSTRACT

A radio receiving apparatus of the present invention is for receiving a radio signal having pulsating signals occurring at specific periods, wherein the radio receiving apparatus corrects signal levels received during communication in individual regions into which each of the aforementioned periods is divided based on signal levels received in the individual regions under conditions where the radio signal is not received. As a result of this correction, the radio receiving apparatus of the present invention can decrease the influence of noise having periodicity and improve reliability of communication.

10 Claims, 18 Drawing Sheets

U.S. PATENT DOCUMENTS

| | | |
|---|---|---|
| 2005/0037805 A1 | 2/2005 | Lee et al. |
| 2005/0135513 A1 | 6/2005 | Kang et al. |
| 2005/0213635 A1 | 9/2005 | Terada et al. |

FOREIGN PATENT DOCUMENTS

| | | |
|---|---|---|
| JP | 2-033214 A | 2/1990 |
| JP | 10-508725 | 8/1998 |
| JP | 2998794 B2 | 11/1999 |
| JP | 2003-101509 | 4/2003 |
| JP | 2005-197918 | 7/2005 |
| JP | 2005-217899 | 8/2005 |
| JP | 2006-060737 | 3/2006 |
| JP | 2006-94169 | 4/2006 |
| KR | 2005-0019943 | 3/2005 |
| KR | 2005-0061928 | 6/2005 |
| WO | 96/09694 | 3/1996 |

OTHER PUBLICATIONS

English language Abstract of KR 2005-0061928, Jun. 23, 2005.
English language Abstract of JP 2003-101509, Apr. 4, 2003.
English language Abstract of JP 2005-217899, Aug. 11, 2005.
English language Abstract of JP 10-508725, Aug. 25, 1998.
English language Abstract of JP 2006-94169, Mar. 28, 1996.
English language Abstract of JP 2-033214 A, Feb. 2, 1990.
English language Abstract of JP 2998794 B2, Nov. 5, 1999.
Japan Office action issued in corresponding JP 2006-171526, dated Dec. 7, 2010, along with a partial English language translation thereof.

* cited by examiner

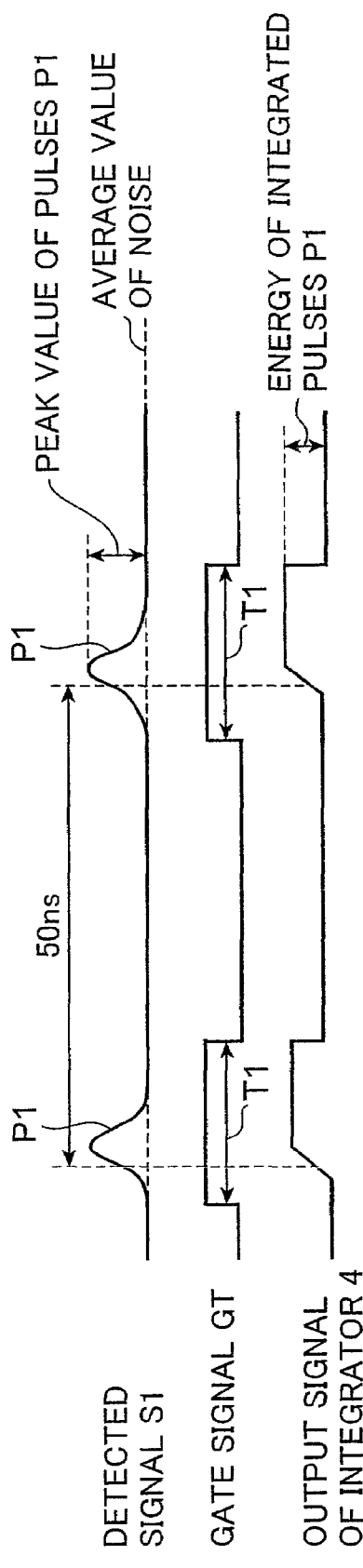
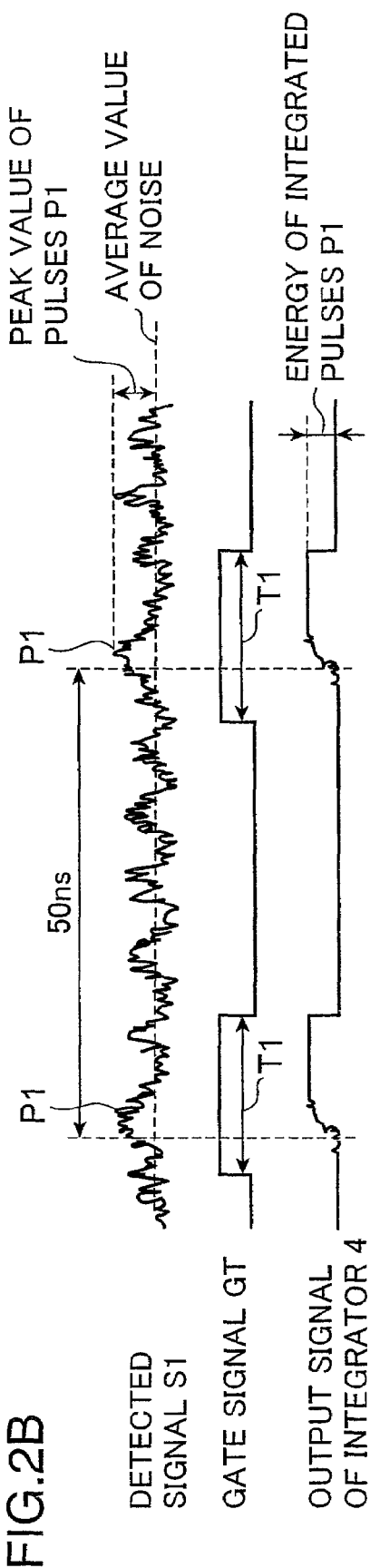

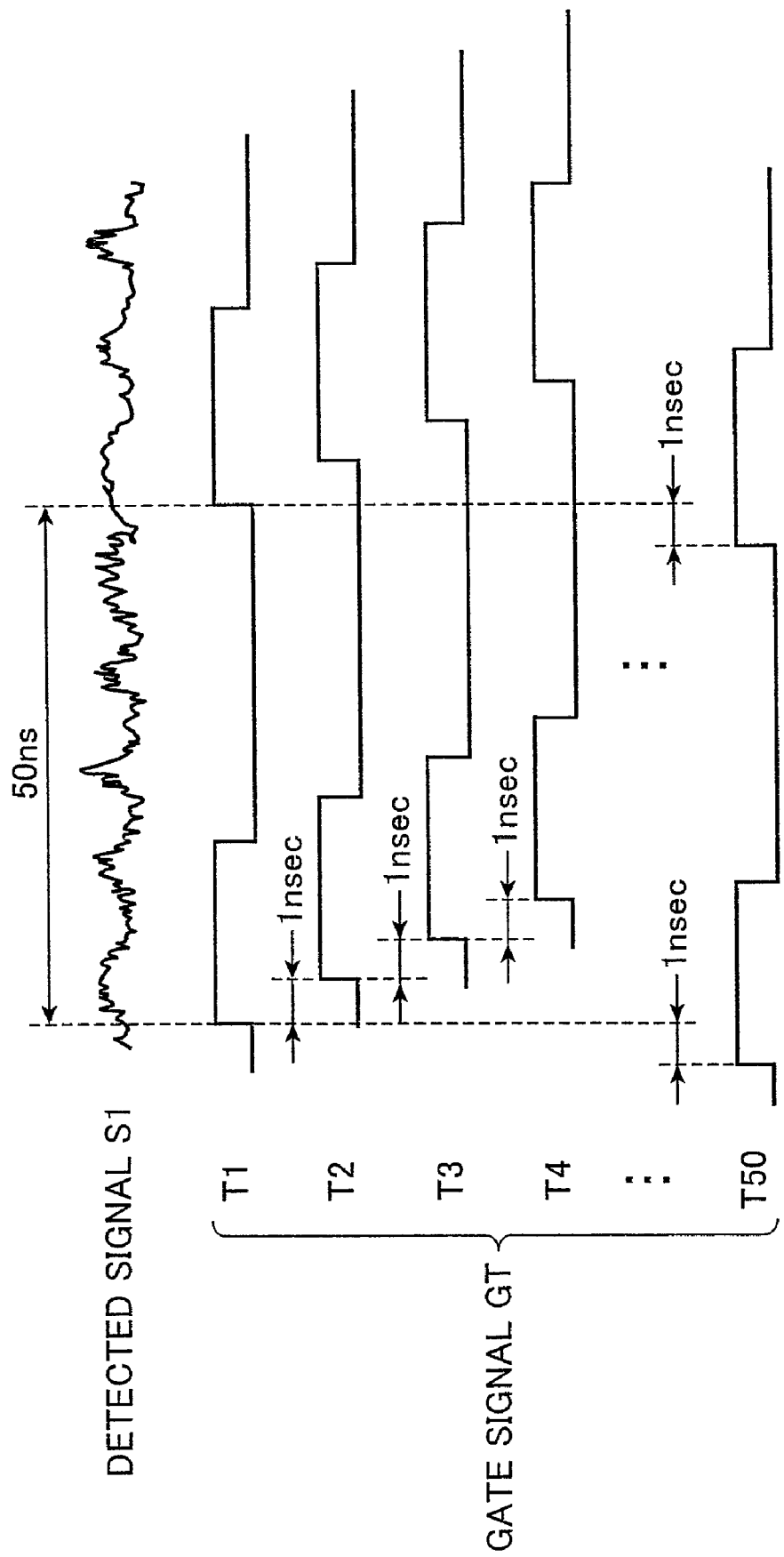

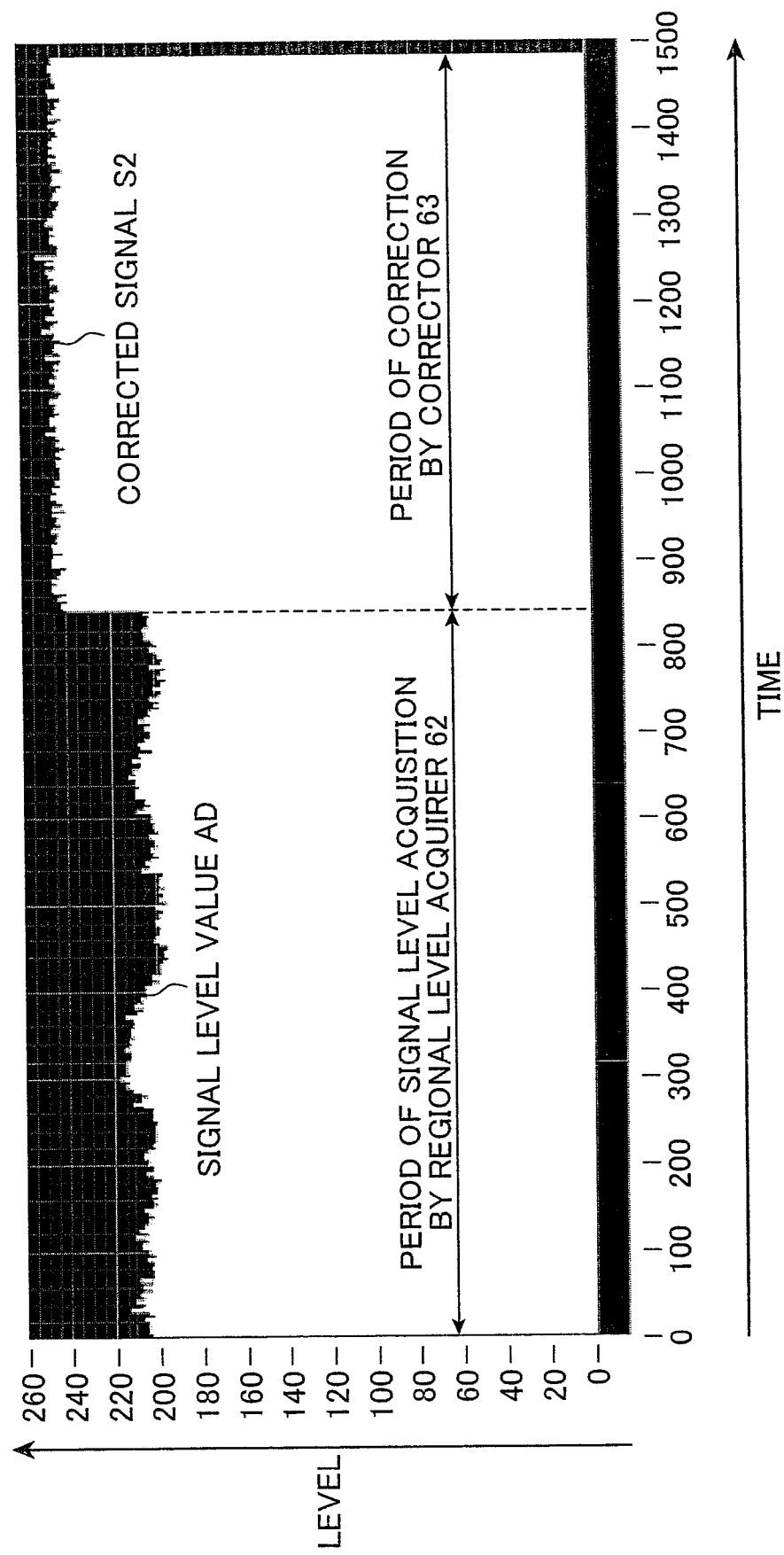

OUTPUT OF RADIO
TRANSMITTING
APPARATUS

OUTPUT OF
DETECTOR

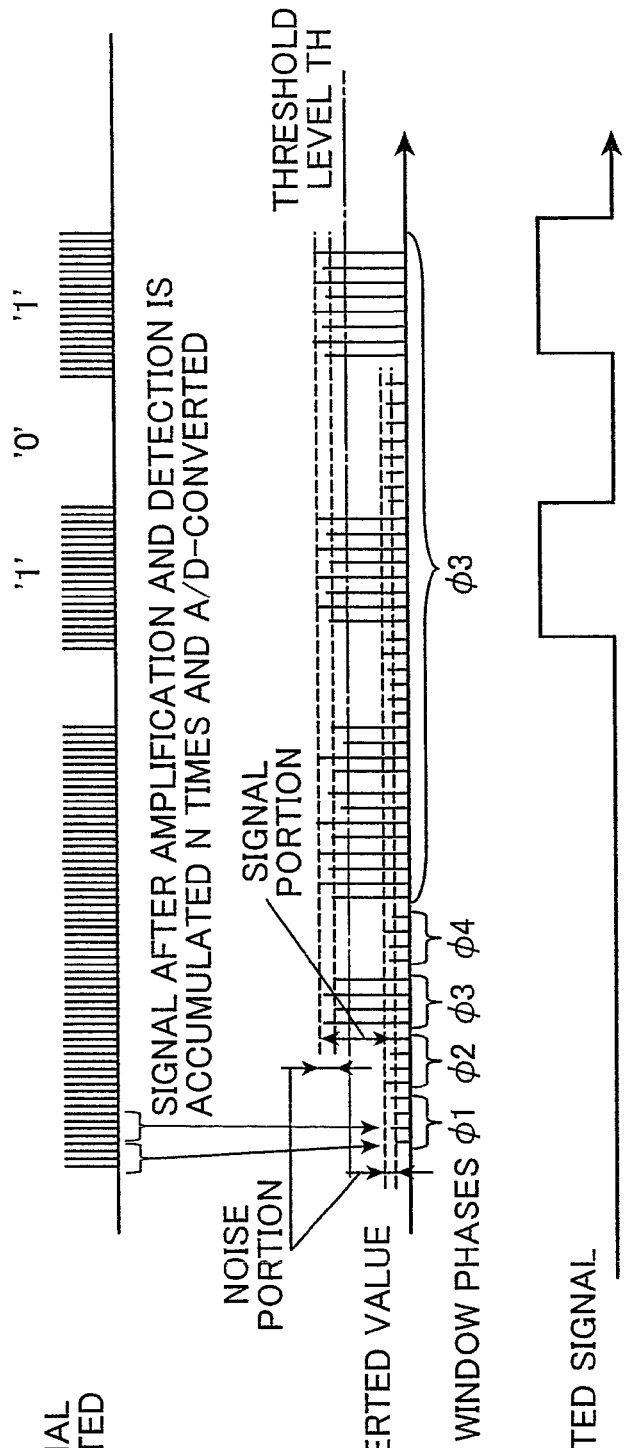

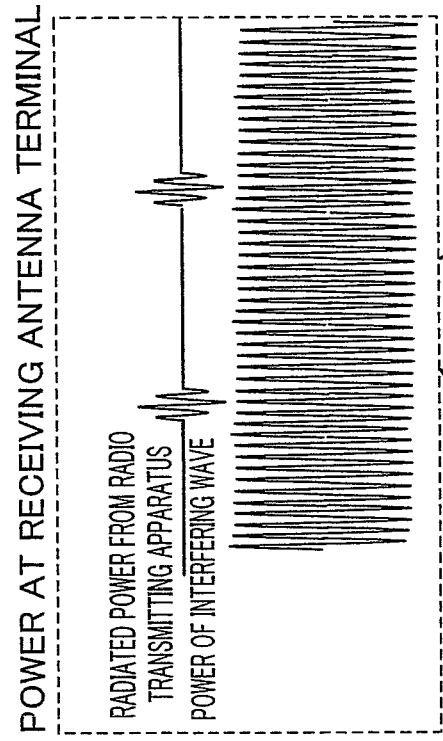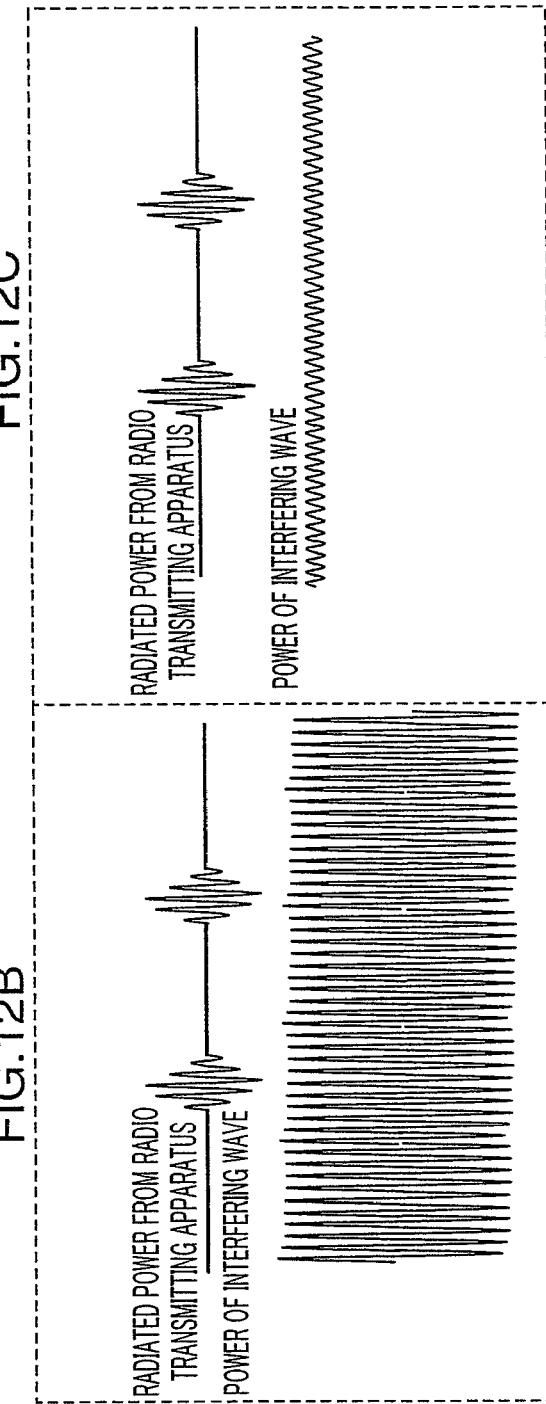

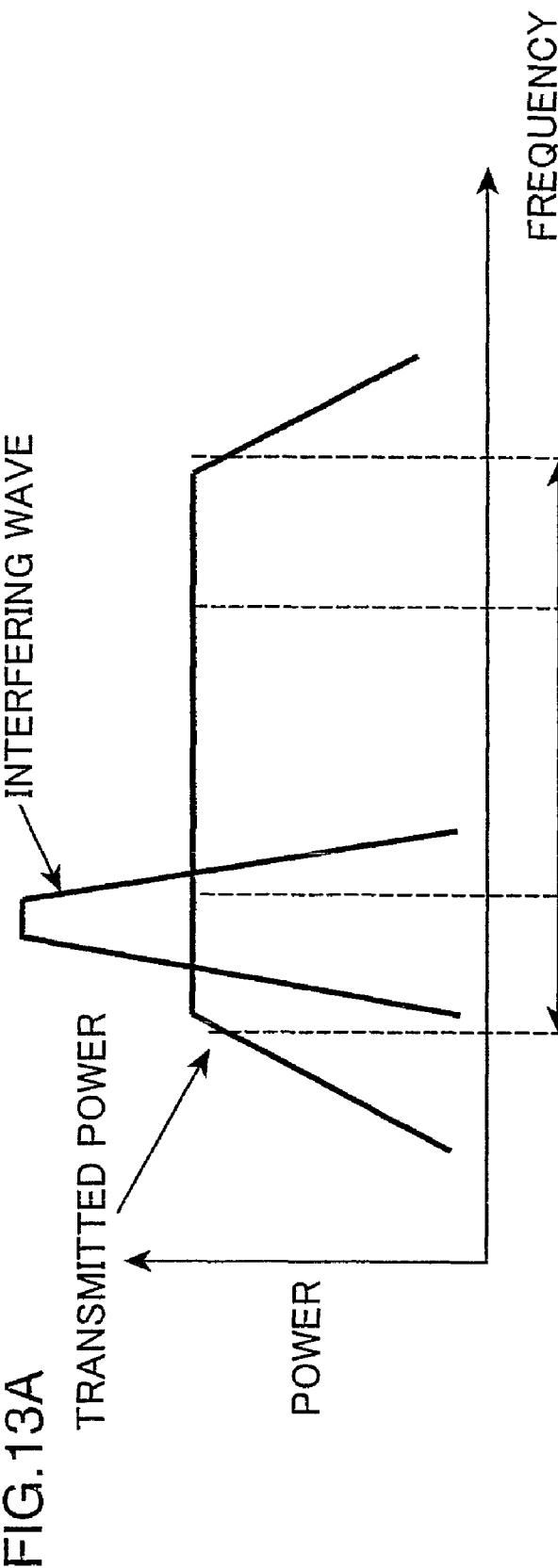
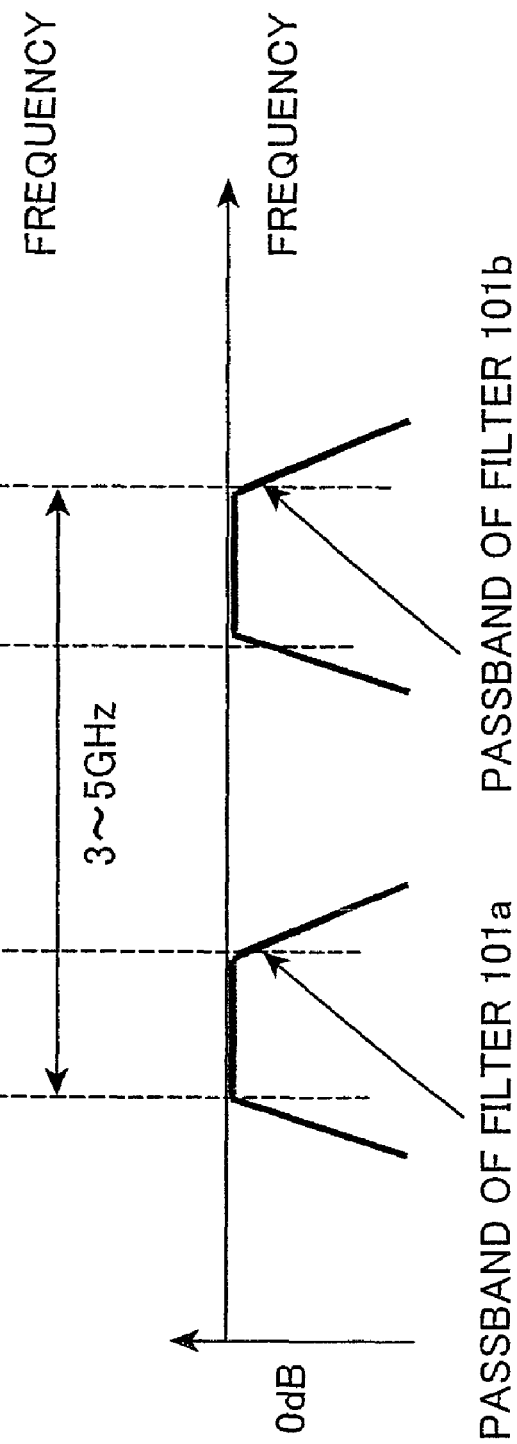
FIG.13A
FIG.13B

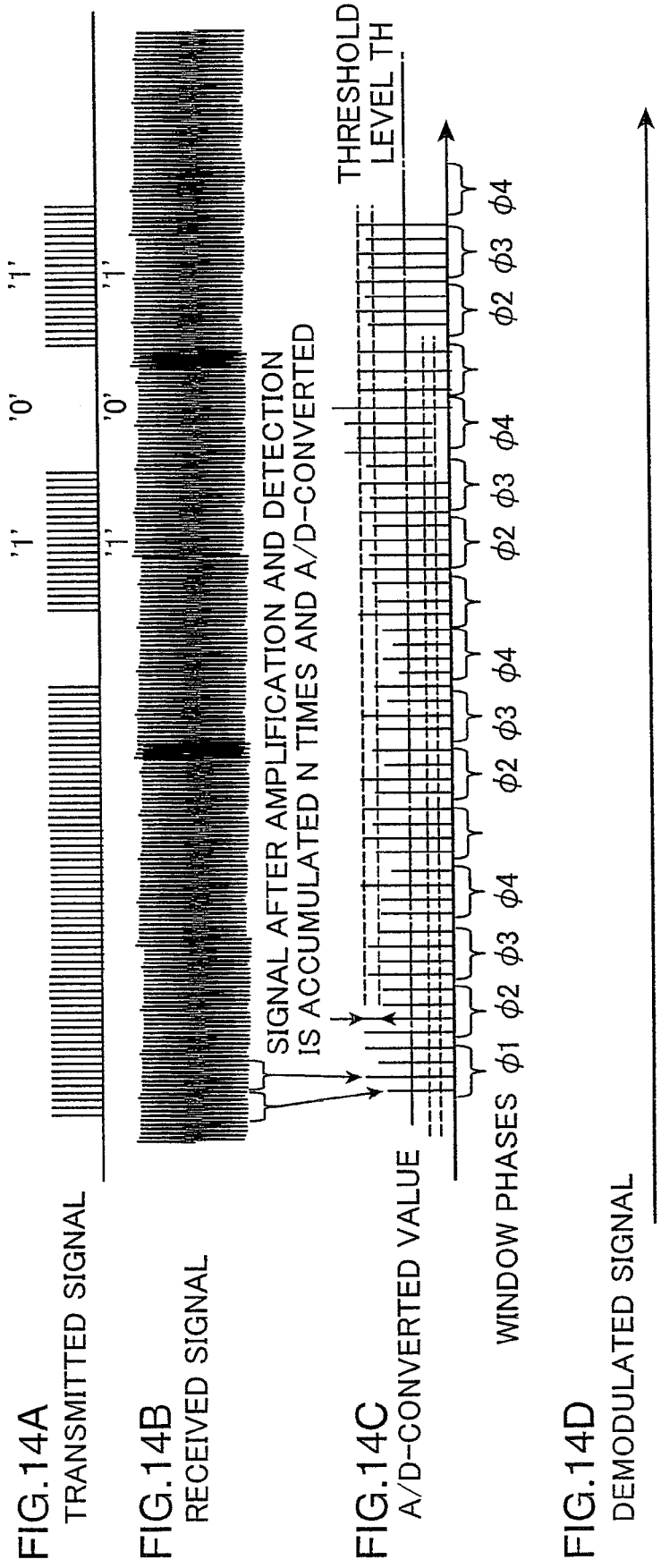

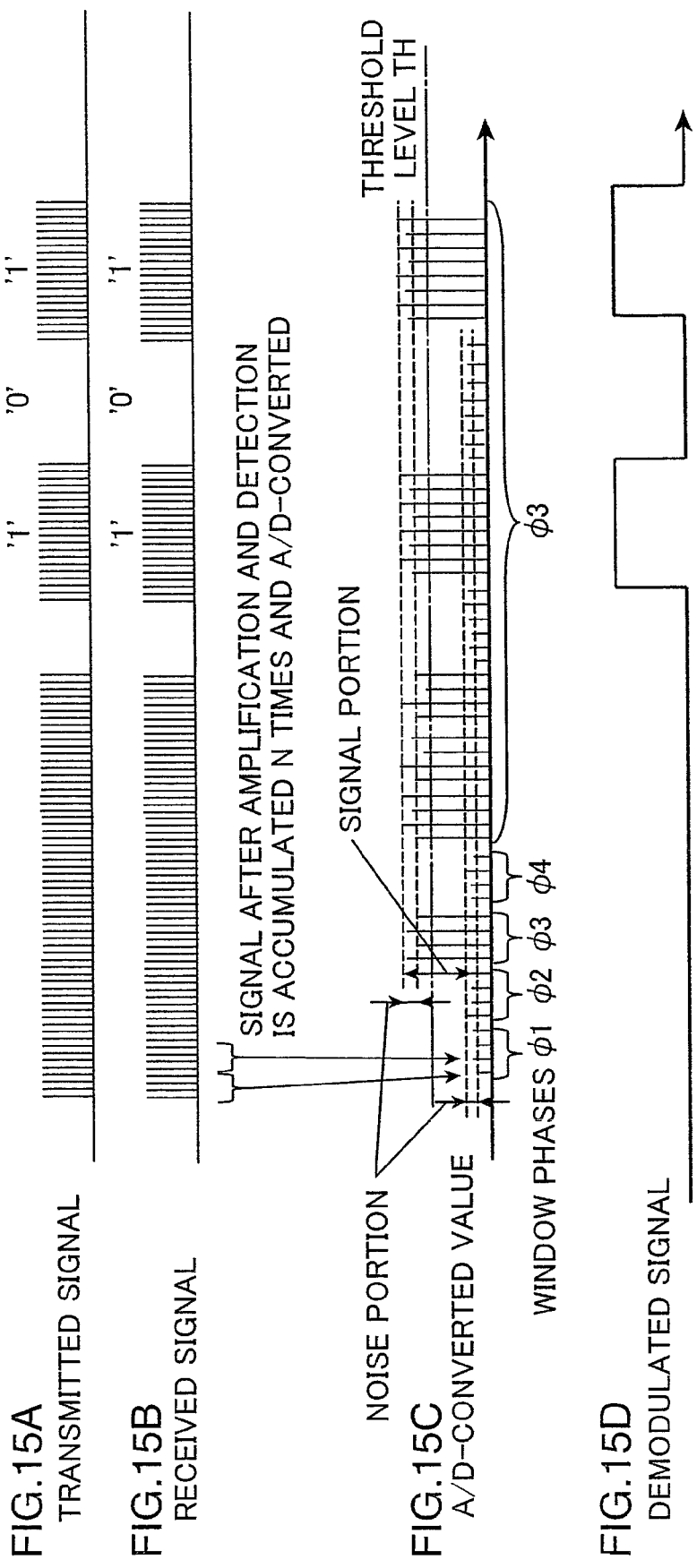

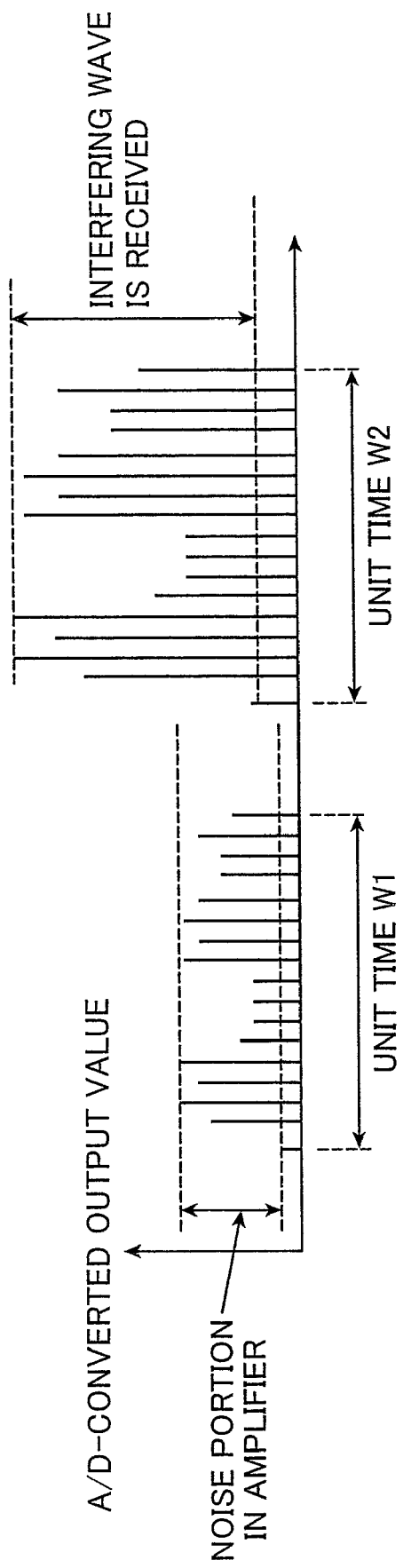

RADIO RECEIVING APPARATUS AND RADIO RECEIVING METHOD

TECHNICAL FIELD

The present invention relates to a radio receiving apparatus and a radio receiving method for receiving an ultra-wideband communications radio signal.

BACKGROUND ART

Ultra-wideband (UWB) communications technology has gained attention in recent years as one of high-speed radio transmission methods. The UWB communications technology enables communications over an extremely broad bandwidth by using pulse trains made up of pulse signals synchronized with particular periodic timing. Known as one form of UWB communications is communication carried out by using pulse trains made up of pulse signals of extremely short pulselengths, such as 1 ns or less, without using a carrier (refer to Patent Documents 1 and 2, for example).

FIG. 18 is a block diagram showing a radio receiving apparatus 1000 for UWB communications according to the prior art. The radio receiving apparatus 1000 shown in FIG. 18 is provided with an antenna 1001 for receiving a UWB communications signal sent from a radio transmitting apparatus by UWB communications, an amplifier 1002 for amplifying the UWB communications signal received by the antenna 1001, an integration circuit 1003 for integrating a signal Sy amplified by the amplifier 1002 based on a template signal Sx indicating specific timing in a time sequence output from a controller 1005 to thereby generate an integral voltage Sz indicating a correlation between the template signal Sx and the signal Sy, an analog-to-digital converter (hereinafter referred to as "A/D converter" for short) 1004 for converting the integral voltage Sz into a digital value, and the controller 1005 for outputting the template signal Sx to the integration circuit 1003 while synchronizing the same with the UWB communications signal based on correlation values obtained by the A/D converter 1004 and for performing demodulation to extract data from the correlation values obtained by the A/D converter 1004.

The radio receiving apparatus 1000 thus configured periodically generates the template signal Sx in synchronism with UWB communications pulse signals and receives the UWB communications pulse signals during specific periods indicated by the template signal Sx, such as during 10-ns window periods only, whereby the radio receiving apparatus 1000 receives significant UWB communications pulse signals by excluding background noise which has no fixed periodicity like the UWB communications pulse signals.

UWB communications use a pulse signal of extremely short pulselengths, such as 1 ns or less, without using a carrier. Therefore, spectral density of transmitted power in UWB communications is extremely low as compared to other radio communications methods. For this reason, internal circuits including the amplifier 1002, the integration circuit 1003, the A/D converter 1004 and the controller 1005 are configured to achieve high sensitivity and, thus, there could arise a situation in which these internal circuits pick up noise as a signal. In particular, noise that occurs due to clock signals used in these internal circuits, such as a reference clock signal used in the controller 1005 for generating the template signal Sx, has periodicity. Therefore, there can occur a case where noise is misinterpreted as a received pulse, causing such inconvenience as a reduction in reliability of communication, if such noise having periodicity becomes synchronized with window periods indicated by the template signal Sx.

Patent Document 3 shows an arrangement for searching for a synchronization signal pattern and achieving synchronization when synchronizing receive timing of a radio receiving apparatus with a pulse signal made of a pulse train, wherein a search for the synchronization signal pattern is carried out by increasing amplifier gain when a received signal pattern (pulse train) always has a "0" value on the assumption that the gain is too low, and decreasing the amplifier gain when the received signal pattern always has a "1" value on the assumption that the gain is too high.

The prior art of Patent Document 3 employs an amplifier gain approach. This approach is preferable for optimizing a noise floor level due to thermal noise of the radio receiving apparatus, for instance, relative to a received signal level and extracting the aforementioned pulse train. If there exists an interfering wave within a receiver bandwidth, and especially if power of the interfering wave is large, it becomes impossible to receive signals.

Patent Document 1: Japanese Unexamined Patent Publication No. 2005-217899
Patent Document 2: Japanese Unexamined Patent Publication No. 1998-508725
Patent Document 3: Japanese Unexamined Patent Publication No. 2006-94169

DISCLOSURE OF THE INVENTION

The present invention has been made in light of the aforementioned circumstances. Accordingly, it is an object of the invention to provide a radio receiving apparatus which can improve reliability of communication.

A radio receiving apparatus according to one mode of the present invention is for receiving a radio signal having pulsating signals occurring at specific periods, wherein the radio receiving apparatus corrects signal levels received during communication in individual regions into which each of the aforementioned periods is divided based on signal levels received in the individual regions under conditions where the aforementioned radio signal is not received, respectively. As a result of this correction, the radio receiving apparatus according to the one mode of the present invention can decrease the influence of noise and improve reliability of communication.

BRIEF DESCRIPTION OF THE DRAWINGS

FIGs. 2A and 2B each shows is a signal waveform chart for explaining the working of the radio receiving apparatus shown in FIG. 1;

FIG. 3 is a signal waveform chart for explaining the working of a regional level acquirer shown in FIG. 1;

FIG. 4 is a diagram showing an example of a corrected signal obtained by a corrector shown in FIG. 1;

FIGS. 8A, 8B and 8C show waveform charts for explaining a method of demodulating the radio signal used for UWB communications;

FIGS. 12A, 12B and 12C are diagrams for explaining filter passband characteristics for a transmitted signal and an interfering wave;

FIGs. 13A and 13B are graphs showing the filter passband characteristics for the transmitted signal and the interfering wave;

FIGS. 14A, 14B, 14C and 14D are waveform charts for explaining a demodulated signal obtained when the interfering wave could not be attenuated by filters;

FIGS. 15A, 15B, 15C and 15D are waveform charts for explaining a demodulated signal obtained when the interfering wave could be attenuated by the filters;

FIG. 16 is a waveform chart for explaining adjustment of gain of an amplifier against the interfering wave;

BEST MODES FOR CARRYING OUT THE INVENTION

Embodiments of the present invention are described hereunder with reference to the drawings, in which elements designated by the same symbols have the same configuration and explanation thereof may be omitted.

Figure 1:
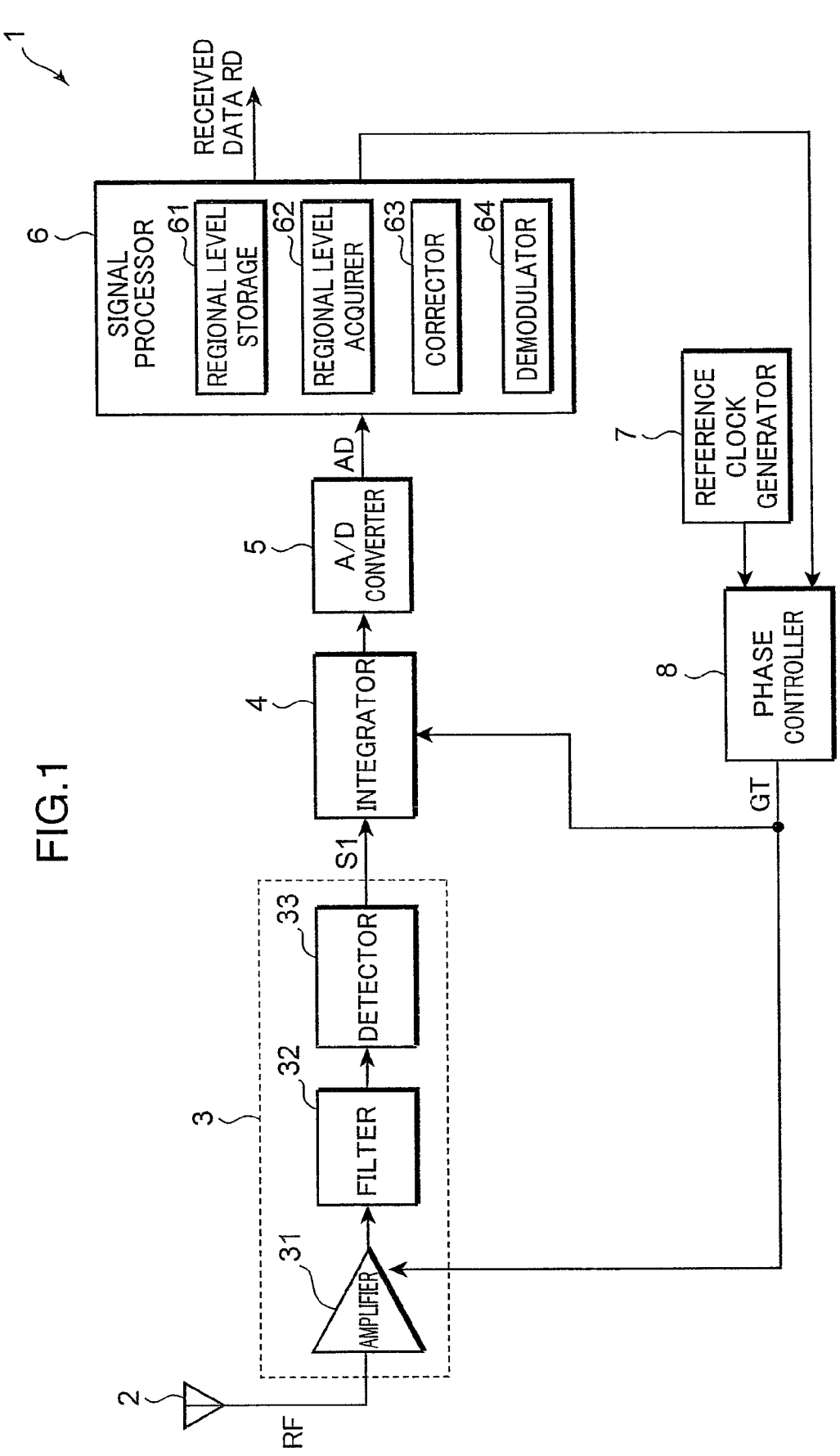
FIG. 1 is a block diagram showing an example of the configuration of a radio receiving apparatus according to an embodiment of the present invention.

FIG. 1 is a block diagram showing an example of the configuration of a radio receiving apparatus 1 according to an embodiment of the present invention. The radio receiving apparatus 1 shown in FIG. 1 is provided with an antenna 2, a pulse demodulator 3, an integrator 4, an A/D converter 5, a signal processor 6, a reference clock generator 7 and a phase controller 8.

The antenna 2 receives a radio signal RF by UWB communications. The pulse demodulator 3 is a circuit for demodulating the radio signal RF received by the antenna 2 into pulses. The pulse demodulator 3 is provided with an amplifier 31 for amplifying the signal received by the antenna 2, a filter 32 which is a bandpass filter for filtering the signal amplified by the amplifier 31, and a detector 33 for outputting a detected signal S1 obtained by performing envelope detection or peak detection to the integrator 4, for example. The pulse demodulator 3 converts the signal received by the antenna 2 having a frequency band of 3.2 GHz, for example, into a frequency of about 500 Hz by detecting the received signal.

The integrator 4 integrates the detected signal S1 which has been frequency-converted by the pulse demodulator 3 and outputs an integral value thus obtained to the A/D converter 5. The A/D converter 5 is an 8-bit (255-stage) A/D converter, for example, which converts the signal frequency-converted by the pulse demodulator 3 into a digital signal and outputs the same to the signal processor 6 as a signal level value AD.

The signal processor 6 is configured with a central processing unit (CPU) for performing specified mathematical operations, a read-only memory (ROM) storing a specific control program, a random access memory (RAM) used for temporary data storage and/or as a regional level storage 61, and peripheral circuits of these elements. The signal processor 6 functions as a regional level acquirer 62 for acquiring the signal level value AD for each of plural regions into which the period of a pulse signal is divided and storing in the regional level storage 61 signal levels in the individual regions acquired therein under conditions where the signal level value AD is not received by the antenna 2, a corrector 63 for correcting the signal levels in the individual regions received by the antenna 2 based on the signal levels stored in the regional level storage 61 for the individual regions, respectively, and a demodulator 64 for demodulating the radio signal RF according to the signal levels in the individual regions corrected by the corrector 63 and then outputting the demodulated radio signal as received data RD to the exterior by executing the control program stored in the ROM.

Configured with a crystal oscillator, the reference clock generator 7 generates a clock signal having the same period as that of the pulse signal used for UWB communications and outputs the clock signal to the phase controller 8.

The phase controller 8 outputs a gate signal GT for controlling operating timing of the pulse demodulator 3 to the amplifier 31 and the integrator 4 based on the clock signal output from the reference clock generator 7. More specifically, the phase controller 8 outputs a pulse signal having a pulselength approximately equal to or slightly longer than the pulselength of the pulse signal used for UWB communications, e.g., a pulse signal having a 10-ns pulselength, to the amplifier 31 and the integrator 4 at intervals of the pulse signal used for UWB communications, e.g., at intervals of 50 ns, as the gate signal GT indicating window periods. The phase controller 8 is configured to vary the timing of pulses of the gate signal GT indicating the window periods according to a control signal fed from the signal processor 6.

The amplifier 31 and the integrator 4 perform amplification and integration, respectively, in synchronism with the timing of the pulses of the gate signal GT, and not with other timing. With this arrangement, the radio signal RF received by the antenna 2 is detected by the pulse demodulator 3 and integrated by the integrator 4 at the timing of the pulses of the gate signal GT, or during the window periods and, then, the integral value thus obtained is converted by the A/D converter 5 into the signal level value AD which is output to the signal processor 6.

Next, the working of the radio receiving apparatus 1 configured as described above is described.

FIG. 2 is a signal waveform chart for explaining the working of the radio receiving apparatus 1 shown in FIG. 1. FIG. 2A shows an example of signal waveforms under ideal conditions where the radio receiving apparatus 1 is free of any influence of noise, and FIG. 2B shows an example of signal waveforms when periodic circuit noise is superimposed on a received signal. FIGS. 2A and 2B each show, from top to bottom, signal waveforms of the detected signal S1, the gate signal GT and an output signal of the integrator 4.

Under ideal conditions where the radio receiving apparatus 1 is free of the influence of noise, the radio signal RF received by the antenna 2 is demodulated into pulses by the pulse demodulator 3 and the demodulated pulses P1 are output as the detected signal S1 from the pulse demodulator 3 to the integrator 4 as shown in FIG. 2A. Then, the demodulated pulses P1 are integrated by the integrator 4 and the result of integration is output to the A/D converter 5 at the timing of the pulses of the gate signal GT, or during each successive window period T1.

On the other hand, when the periodic circuit noise is superimposed on the received signal, the detected signal S1 output from the pulse demodulator 3 contains the periodically superimposed noise in addition to the demodulated pulses P1, resulting in an increase in the level of an average value of noise, as shown in FIG. 2B. In this case, a peak value of the demodulated pulses P1 is a value from the level of the average value of noise to a peak of the demodulated pulses P1, so that the peak value of the demodulated pulses P1 decreases as a result of the increase in the level of the average value of noise. For this reason, energy of the demodulated pulses P1 decreases and, as a consequence, the integral value obtained by the integrator 4 by integrating the demodulated pulses P1 decreases, also causing a reduction in the signal level value AD obtained by the A/D converter 5.

Since a difference between the peak value of the demodulated pulses P1 and a peak value of the noise also decreases as shown in FIG. 2B, there is a risk of misinterpreting the noise, with which the window periods T1 of the gate signal GT are synchronized, as received pulses.

Under such circumstances, in the radio receiving apparatus 1, the regional level acquirer 62 first acquires the signal level value AD output from the A/D converter 5, or the signal level value AD during each window period caused by the periodic noise produced by internal circuits, under conditions where the radio signal RF is not transmitted from an unillustrated UWB radio transmitting apparatus and thus the radio signal RF is not received by the antenna 2.

FIG. 3 is a signal waveform chart for explaining the working of the regional level acquirer 62 shown in FIG. 1. FIG. 3 shows, from top to bottom, signal waveforms of the detected signal S1 and the gate signal GT.

First, under conditions where the radio signal RF is not received by the antenna 2, the detected signal S1 output from the pulse demodulator 3 does not contain the demodulated pulses P1 and, therefore, the detected signal S1 caused by the noise is output from the pulse demodulator 3 to the integrator 4.

Thus, the gate signal GT is output from the phase controller 8 to the amplifier 31 and the integrator 4 in phase with the window periods T1 according to the control signal fed from the regional level acquirer 62, the detected signal S1 is integrated by the integrator 4 at the timing of the window periods T1, and the signal level value AD corresponding to the integral value thus obtained is output from the A/D converter 5 to the regional level acquirer 62 at first. The regional level acquirer 62 causes the phase controller 8 to output the gate signal GT in phase with the window periods T1 for a specifically preset time period, e.g., for 8 µs. The regional level acquirer 62 averages the signal level values AD in the window periods T1 obtained during 8 µs and causes the regional level storage 61 to store an average value thus obtained as an average level value AVT1 in the window periods T1.

Next, the regional level acquirer 62 causes the phase controller 8 to output the gate signal GT with timing offset in phase from the window periods T1, e.g., in phase with window periods T2 retarded by 1 ns from the window periods T1, for a specific time period, e.g., for 8 µs. The regional level acquirer 62 averages the signal level values AD in the window periods T2 obtained over plural cycles during 8 µs and an average value thus obtained is stored in the regional level storage 61 as an average level value AVT2 in the window periods T2.

With the window periods successively offset in 1-ns steps by the regional level acquirer 62 in a similar fashion, average level values AVT1-AVT50 obtained from 50 window periods defined in 50 ns which is the recurring interval of the demodulated pulses P1, or the signal level values occurring during the individual window periods due to the periodic noise produced by the internal circuits, are stored in the regional level storage 61. In this case, window periods T1-T50 correspond to an example of plural regions mentioned in the claims.

The regional level acquirer 62 may cause the regional level storage 61 to store the average level values AVT1-AVT50 in the individual window periods with the individual window periods (regions) related to addresses of the regional level storage 61, or with identification data indicating the individual window periods and the average level values AVT1-AVT50 related to each other.

Next, the radio signal RF received by the antenna 2 is pulse-demodulated by the pulse demodulator 3 and integrated by the integrator 4, and the result of integration is converted by the A/D converter 5 into the signal level values AD which are output to the corrector 63. Then, the corrector 63 corrects the signal level values AD by subtracting the average level values AVT1-AVT50 stored in the regional level storage 61, that is, the signal level values occurring during the individual window periods due to the periodic noise produced by the internal circuits, from the signal level values AD in the respective window periods T1-T50, and a corrected signal S2 obtained by this correction is demodulated by the demodulator 64 and output as the received data RD to the exterior.

With this arrangement, the average level values AVT1-AVT50 stored in the regional level storage 61, that is, the signal level values occurring during the individual window periods due to the periodic noise produced by the internal circuits, are corrected by the corrector 63 by subtracting the average level values AVT1-AVT50 from the signal level values AD to decrease the influence of the noise having periodicity even when the noise having periodicity is superimposed on the signal level values AD output from the A/D converter 5. It is therefore possible to improve reliability of communication.

The regional level acquirer 62 is not limited to the aforementioned example in which the average level values AVT1-AVT50 are stored in the regional level storage 61 but may be configured such that the regional level storage 61 directly stores the signal level values AD in the window periods T1-T50 and the corrector 63 corrects the received signal by using the signal level values AD in the window periods T1-T50. However, if the corrector 63 uses the average level values AVT1-AVT50, measurement accuracy of the signal level values in the individual window periods with the periodic noise produced by the internal circuits is improved, thereby enabling an improvement in the reliability of communication.

Also, the corrector 63 may be configured to generate the corrected signal S2 by adding differences between a preset reference value REF and the average level values AVT1-AVT50 stored in the regional level storage 61 to the signal level values AD in the respective window periods T1-T50. More specifically, expressing the signal level values AD in the respective window periods T1-T50 as AD1-AD50, for example, the corrector 63 may generate the corrected signal S2 based on equation (1) below:

$$S2 = ADn + (REF - AVTn) \quad (1)$$

(where n=1, 2, 3 . . . , 50)

If the reference value REF is set to "240" here, for example, the corrected signal S2 is approximately equal to the reference value REF and thus becomes "240" under conditions where no radio signal RF is received as shown in FIG. 4. With this arrangement, the corrected signal S2 takes a positive value even when the demodulated pulses P1 take a negative value, for example, so that it becomes unnecessary to process negative values and, thus, signal processing is facilitated.

Also, the regional level acquirer 62 may cause the regional level storage 61 to store the differences between the preset reference value REF and the average level values AVT1-AVT50 as corrected values C1-C50 for the respective window periods T1-T50 as indicated by equation (2) below:

$$Cn = REF - AVTn \quad (2)$$

(where n=1, 2, 3 ..., 50)

Then, the corrector 63 may be configured to generate the corrected signal S2 by adding the corrected values C1-C50 for the individual window periods stored in the regional level storage 61 to the signal level values AD1-AD50 in the individual window periods T1-T50, respectively, as indicated by equation (3) below:

$$S2 = ADn + Cn \quad (3)$$

(where n=1, 2, 3 ..., 50)

With this arrangement, the corrector 63 is required to perform mathematical operation of equation (3) for correcting the radio signal RF so that it becomes possible to relieve the work load required for mathematical operation during reception of the radio signal RF compared to a case where the mathematical operation of equation (1) is to be performed.

While the foregoing discussion has revealed an example in which 50 window periods (regions) are defined in a pulse interval of the radio signal RF, the number of window periods (phase difference) may be determined as appropriate. The larger the number of window periods with the phase difference between successive window periods reduced, the more the accuracy of correction is improved, resulting in an improvement in the reliability of communication.

Also, while the foregoing discussion has revealed an example in which the adjacent window periods overlap one another, this example may be modified such that the adjacent window periods exist next to one another without overlapping. This arrangement makes it possible to reduce the number of window periods defined in the pulse interval of the radio signal RF.

Also, while the foregoing discussion has revealed an example in which each window period is set to 10 ns which is approximately equal to or slightly longer than the pulselength of the pulse signal used for UWB communications, it is possible to reduce the number of window periods defined in the pulse interval of the radio signal RF by lengthening the window periods. In this case, a time period of integrating noise components increases as a result of the lengthening of the window periods, resulting in a reduction in signal-to-noise ratio (S/N ratio), so that the window periods are to be properly set in light of a balance between an increase in circuit load caused by the increase in the number of window periods and the reduction in the S/N ratio caused by the lengthening of the window periods.

Furthermore, the radio receiving apparatus 1 of the above-described embodiment may be configured to reduce the influence of noise to further improve the reliability of communication by use of a filter portion which can extract at least part of components in a frequency band used by the radio signal RF taking advantage of the fact that the pulse signal used for UWB communications is broadband.

Figure 5:
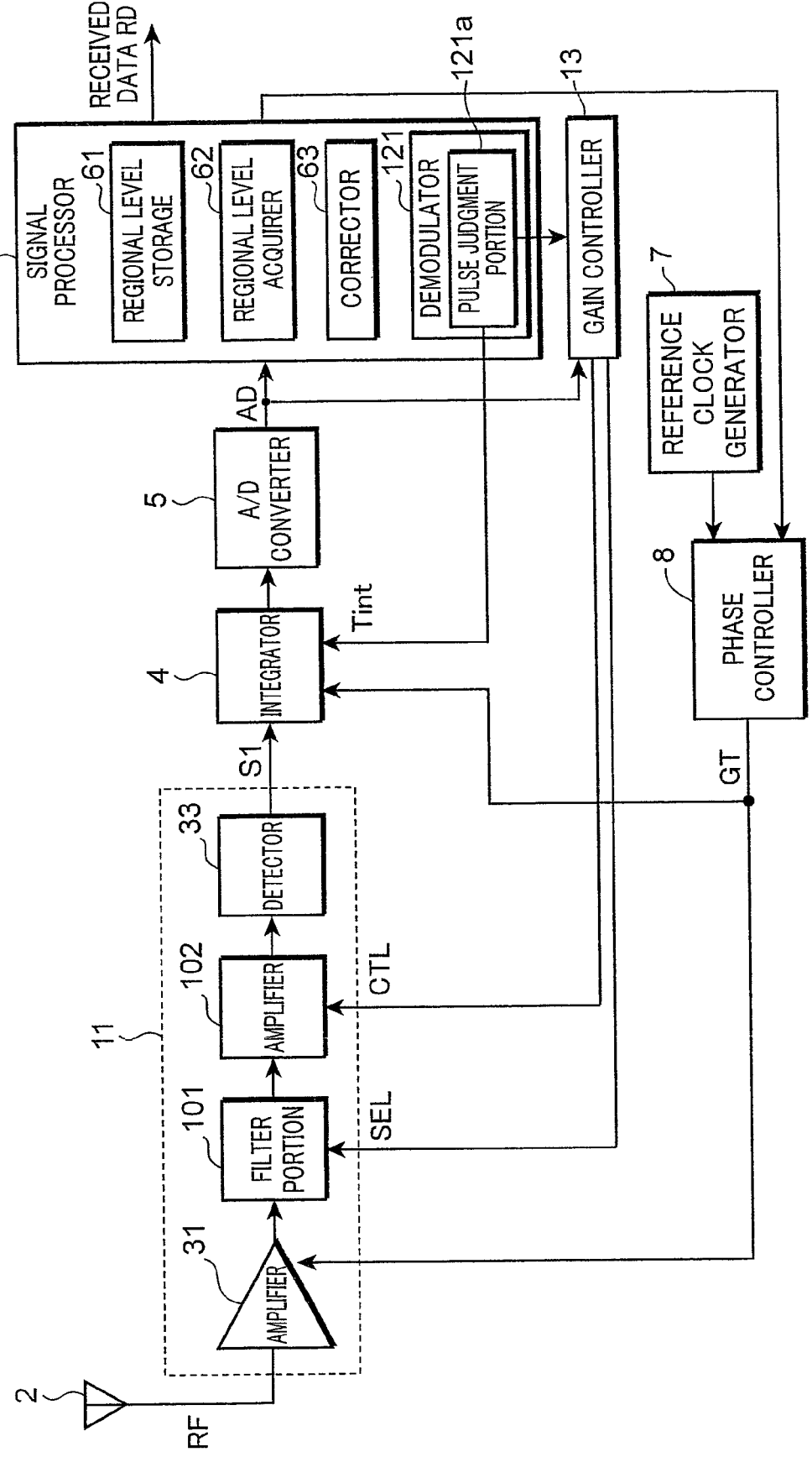
FIG. 5 is a block diagram showing the configuration of a radio receiving apparatus according to another embodiment of the present invention.

FIG. 5 is a block diagram showing the configuration of a radio receiving apparatus according to another embodiment of the present invention. Referring to FIG. 5, this radio receiving apparatus 10 is configured with an antenna 2, a pulse demodulator 11, an integrator 4, an A/D converter 5, a signal processor 12, a reference clock generator 7, a phase controller 8 and a gain controller 13. Specifically, as compared to the radio receiving apparatus 1 shown in FIG. 1, the radio receiving apparatus 10 shown in FIG. 5 differs from the radio receiving apparatus 1 shown in FIG. 1 in that the same is provided with the pulse demodulator 11 instead of the pulse demodulator 3 of the radio receiving apparatus 1 shown in FIG. 1, the signal processor 12 instead of the signal processor 6 of the radio receiving apparatus 1 shown in FIG. 1, and further the gain controller 104. The former is otherwise the same as the latter.

The pulse demodulator 11 is configured with an amplifier 31, a filter portion 101, an amplifier 102 and a detector 33. Specifically, as compared to the pulse demodulator 3 shown in FIG. 1, the pulse demodulator 11 differs from the radio receiving apparatus 1 shown in FIG. 1 in that the same is provided with the filter portion 101 instead of the filter 32 of the pulse demodulator 3 shown in FIG. 1 and further the amplifier 102 connected between the filter portion 101 and the detector 33. The former is otherwise the same as the latter.

The signal processor 12 is configured with a regional level storage 61, a regional level acquirer 62, a corrector 63 and a demodulator 121. Specifically, as compared to the signal processor 6 shown in FIG. 1, the signal processor 12 differs from the radio receiving apparatus 1 shown in FIG. 1 in that the same is provided with the demodulator 121 instead of the demodulator 64 shown in FIG. 1. The former is otherwise the same as the latter.

For this reason, various points of the radio receiving apparatus 10 like those of the radio receiving apparatus 1 are designated by like symbols and a description of those points is omitted.

Figures 6A, 6B:
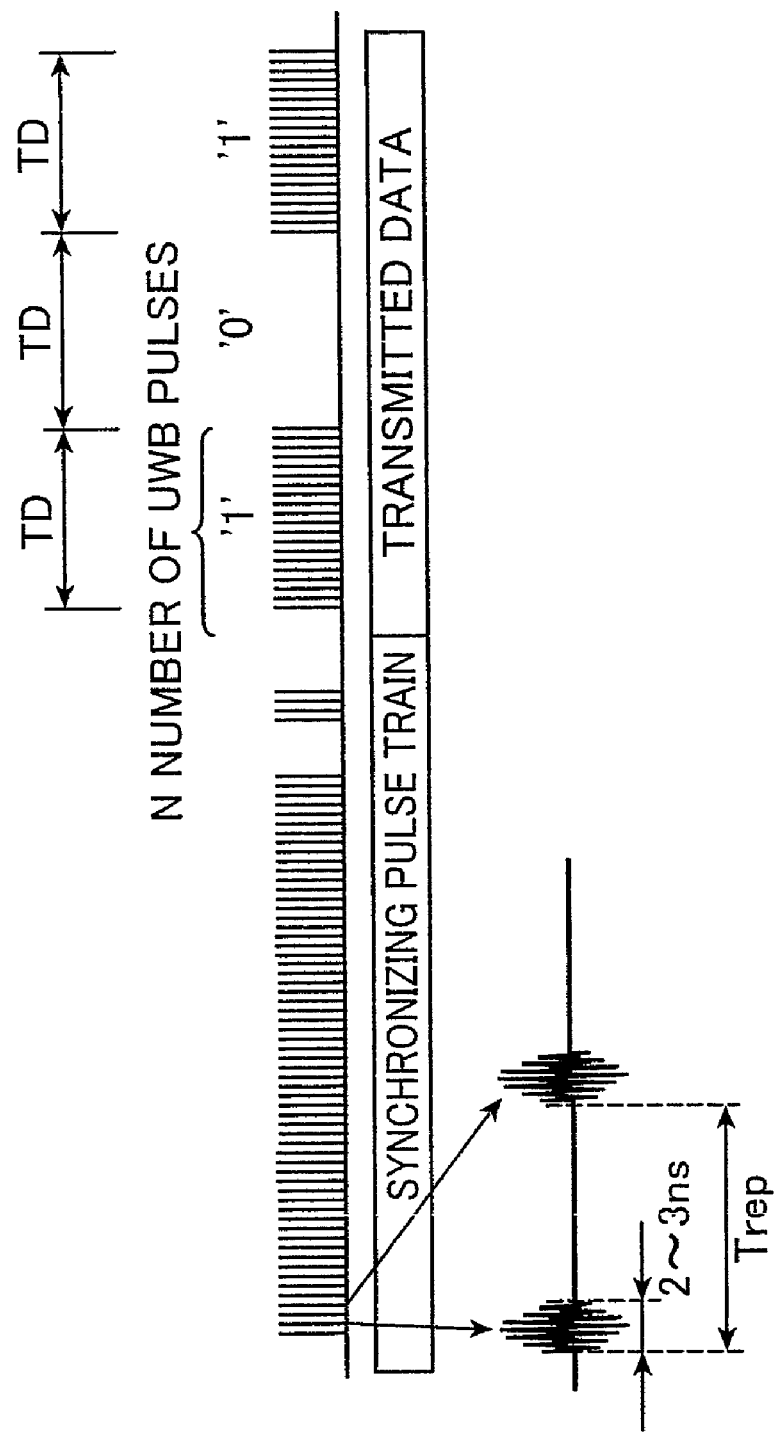
FIGS. 6A and 6B show a waveform chart of a radio signal used for UWB communications.
Figure 7A:
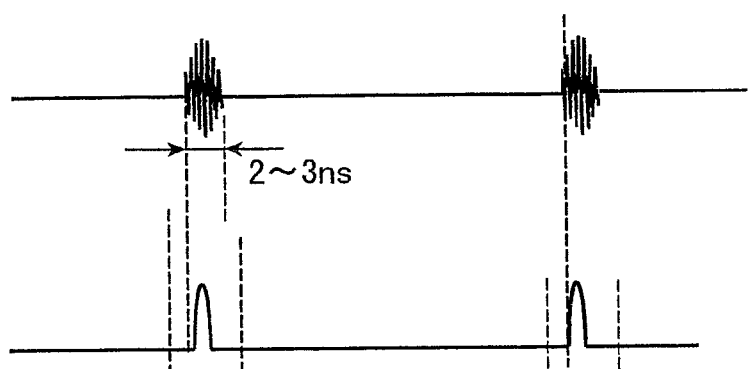
FIGS. 7A, 7B and 7C show waveform charts for explaining receive timing of the radio signal used for UWB communications.
Figure 7B:
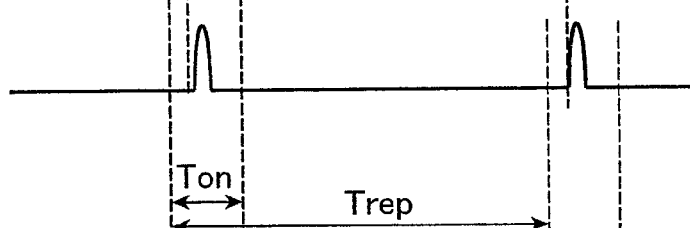
Figure 7C:
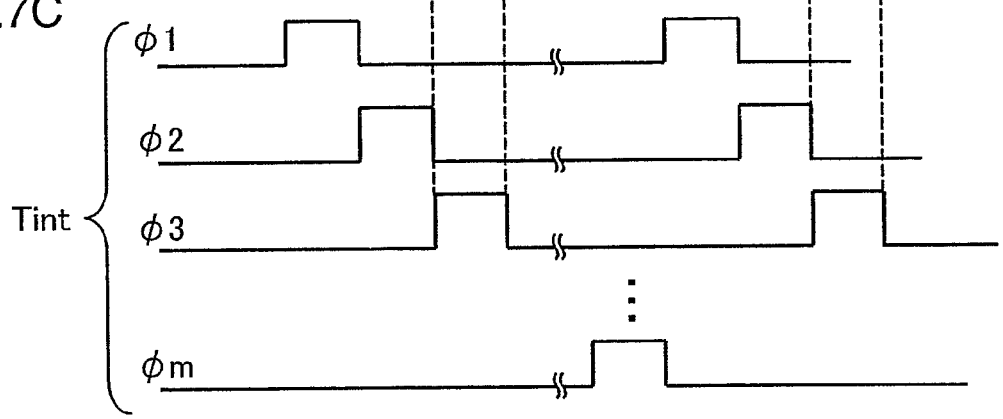

FIG. 6 is a waveform chart of a radio signal used for UWB communications. FIG. 6A shows the radio signal, and FIG. 6B shows pulses of the radio signal. FIG. 7 is a waveform chart for explaining receive timing of the radio signal used for UWB communications. FIG. 7A shows an output of a radio transmitting apparatus (the pulses of the radio signal), FIG. 7B shows an output of the detector, and FIG. 7C shows an integration control signal Tint. FIG. 8 is a waveform chart for explaining a method of demodulating the radio signal used for UWB communications. FIG. 8A shows the radio signal (transmitted signal), FIG. 8B shows values AD A/D-converted by the A/D converter 5, and FIG. 8C shows a demodulated signal.

As shown in FIG. 6A, the radio signal RF transmitted from the unillustrated radio transmitting apparatus is a pulsating signal made up of a synchronizing pulse train used by the radio receiving apparatus 10 to accomplish synchronization with pulses of the pulse signal and a pulse train corresponding to data to be transmitted (baseband signal). The synchronizing pulse train is a signal in which pulses for UWB communications are repeated at specific intervals Trep as shown in FIG. 6B. The number of repeated pulses is set in such a way that pulse positions can be detected on the side of the radio receiving apparatus 10. Then, the synchronizing pulse train is configured with the addition of the existence or non-existence of the pulse train at the end of the synchronizing pulse train indicating the end of pulse synchronization. In the example of FIG. 6, the transmitted data is constructed such that the UWB communications pulses are repeated N times at the aforementioned intervals Trep when the data value is "1", and time during which nothing is output lasts for a time period TD equal to Trep×N when the data value is "0". This time period TD is a 1-bit period of the aforementioned data to be transmitted (baseband signal). Although the data to be transmitted is represented by on/off keying in the aforementioned example, the same may be expressed by other form of modulation, such as bi-phase modulation.

The radio signal RF transmitted from the aforementioned radio transmitting apparatus is received by the broadband antenna 2, components in the frequency band used by the radio signal RF are extracted by the filter portion 101 and subjected to envelope detection or peak detection in the detector 33 and, then, the result of detection is input into the integrator 4. Responding to the integration control signal Tint output from the demodulator 121 of the signal processor 12 for controlling the timing of integration periods in the aforementioned intervals Trep, the integrator 4 performs operation for accumulating detected outputs of the detector 33 N times according to the integration control signal Tint when the integration control signal Tint is active at high level.

An accumulated value thus obtained is A/D-converted by the A/D converter 5 and the A/D-converted value is compared with a specifically preset threshold by a pulse judgment portion 121a of the demodulator 121, whereby the A/D-converted value is judged as "1" or "0" data mentioned above. The pulse judgment portion 121a of the demodulator 121 further demodulates the "1" or "0" data obtained as mentioned above to extract the aforementioned baseband signal therefrom and controls timing of the aforementioned integration periods in such a way that the synchronizing pulse train will be detected during a period when the aforementioned synchronizing pulse train is not detected.

More specifically, the UWB communications pulses transmitted from the aforementioned radio transmitting apparatus are approximately 2- to 3-ns pulses, for example, recurring at the aforementioned intervals Trep as shown in FIG. 7A. As shown in FIG. 7C, timing of occurrence (time slots=window phases) of these UWB communications pulses is set at phases of $\phi 1, \phi 2, \ldots, \phi m$ (where m=50, for example) successively offset within the aforementioned interval Trep by a specified time period Ton which is longer than the aforementioned 2- to 3-ns pulse duration.

Thus, the demodulator 121 controls the integration periods of the integrator 4 according to aforementioned integration control signal Tint so that the integrator 4 determines the accumulated value by accumulating the detected outputs of the detector 33 N times as shown in FIG. 7B at successive points of the phases $\phi 1$-$\phi m$ throughout the aforementioned time period TD. When the A/D-converted value of the accumulated value is equal to or larger than the specific threshold TH as shown in FIG. 8B, the demodulator 121 judges the accumulated value as the aforementioned "1" data, and when the A/D-converted value of the accumulated value is smaller than the specific threshold TH, the demodulator 121 judges the accumulated value as the aforementioned "0" data, whereby the demodulator 121 obtains the demodulated signal as shown in FIG. 8C corresponding to the radio signal RF (transmitted signal) as shown in FIG. 8A.

When the pulse judgment portion 121a detects a time slot (phase point of $\phi 3$ in the example shown in FIG. 7) corresponding to the own apparatus during a search for a synchronization timing carried out by accumulating the detected outputs of the detector 33 while offsetting the aforementioned time slot in steps of the time period Ton during the synchronizing pulse train, a later portion of the search is canceled. (In Example 7 shown in the Figure, the pulse judgment portion 121a carries out the search up to the phase point of $\phi 4$ and judges this phase point as the synchronization timing as the A/D-converted value obtained at a phase point of $\phi 3$ is larger.) This arrangement makes it possible to reduce power consumption required for the search for the synchronization timing.

What is noteworthy in the radio receiving apparatus 10 for UWB communications thus configured is that the aforementioned filter portion 101 is configured to be able to extract at least part of the components in the frequency band used by the radio signal RF and the radio receiving apparatus 10 is provided with the aforementioned gain controller 13.

Figure 9:
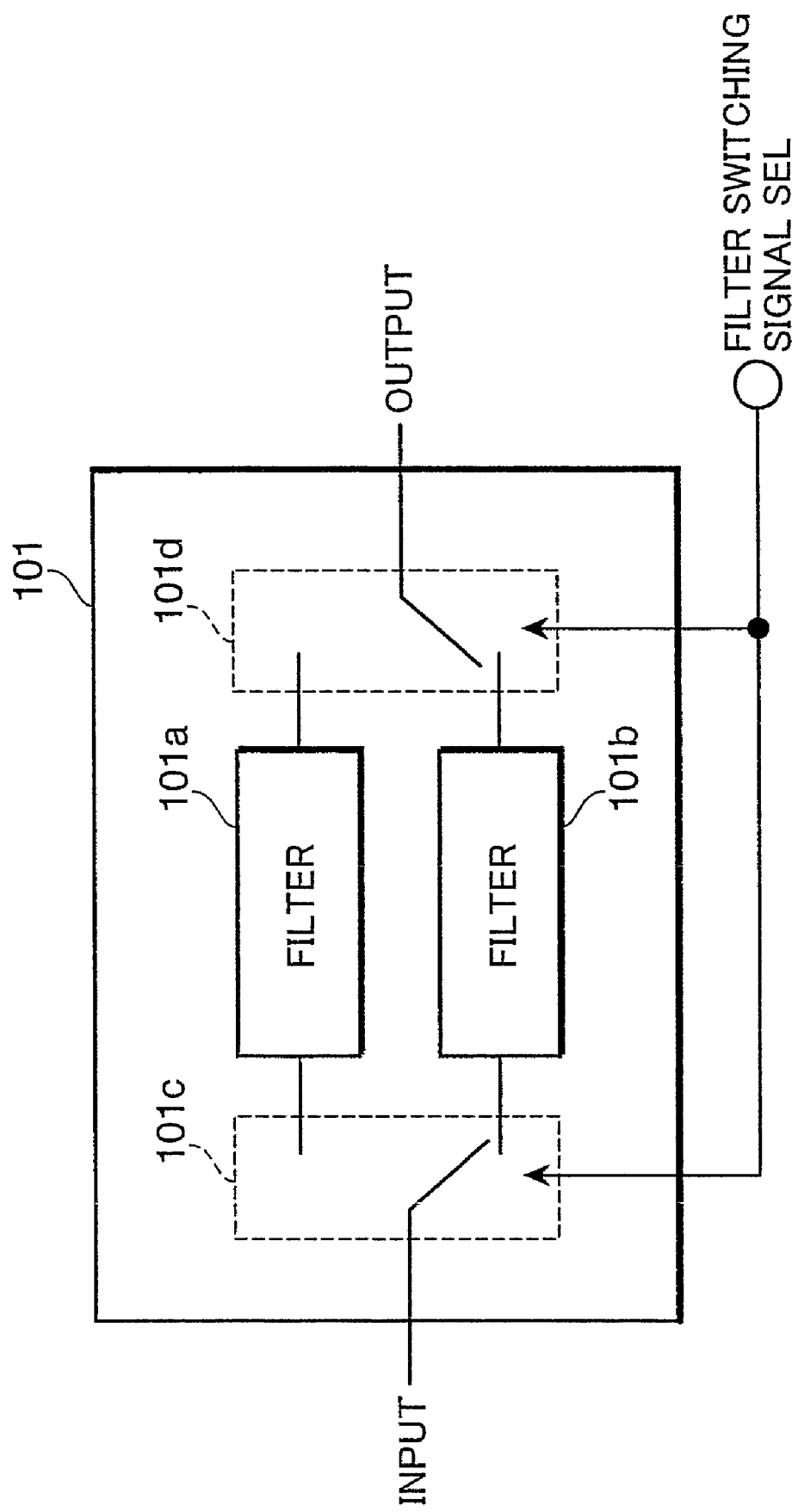
FIG. 9 is a block diagram showing an example of the configuration of a filter portion.
Figure 10A:
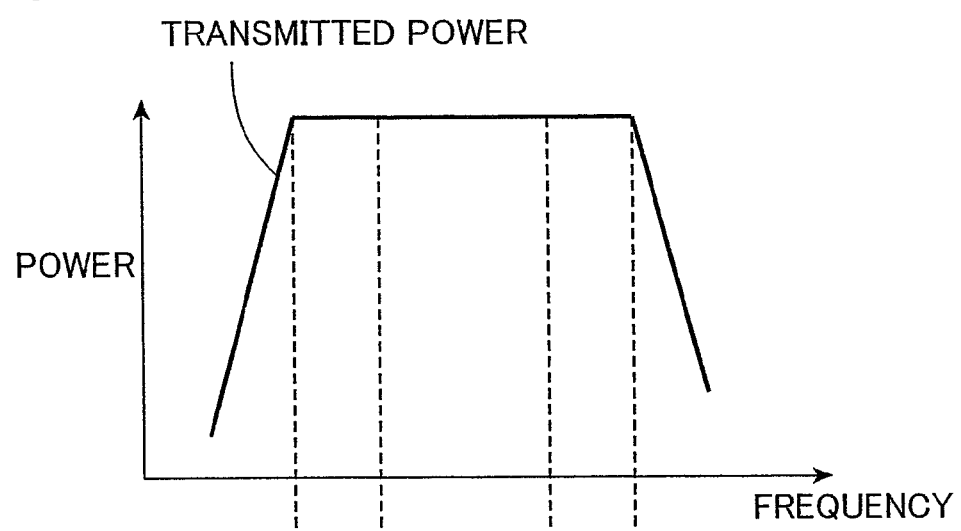
FIGS. 10A and 10B are graphs showing an example of filter passband characteristics for the radio signal used for UWB communications.
Figure 10B:
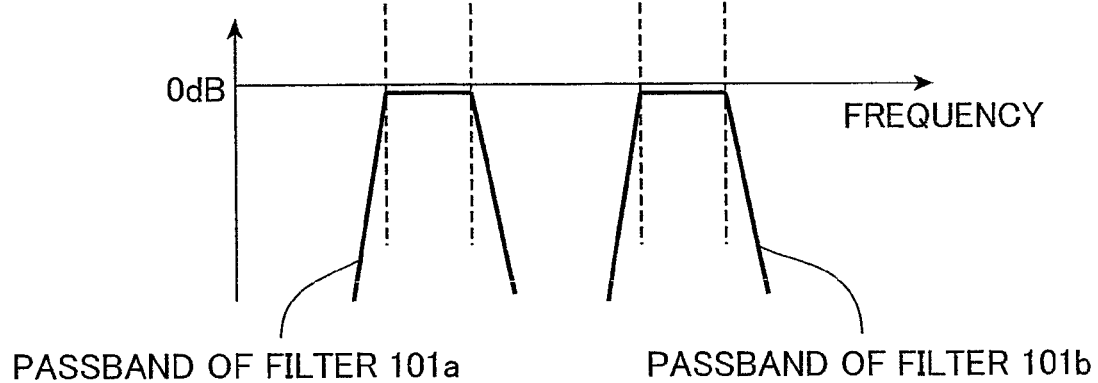

FIG. 9 is a block diagram showing an example of the configuration of the filter portion, and FIG. 10 is a graph showing an example of filter passband characteristics for the radio signal used for UWB communications. FIG. 10A shows frequency characteristics of transmitted power of the radio signal used for UWB communications, the horizontal axis representing frequency and the vertical axis representing power. FIG. 10B shows the filter passband characteristics, the horizontal axis representing frequency.

In the example of FIG. 9, the filter portion 101 is configured with two filters 101a, 101b and switching devices 101c, 101d disposed parallel to each other on upstream and downstream sides of the filters 101a, 101b, respectively, for switching a signal path to one of the filters 101a, 101b. The switching devices 101c, 101d are controlled to alternately switch the signal path in an interlocked fashion by a filter switching signal SEL fed from the gain controller 13.

The transmitted signal (radio signal RF) from the aforementioned radio transmitting apparatus is an impulse signal having a broad bandwidth of 3-5 GHz as shown in FIG. 10A, for example. Corresponding to this fact, the characteristics of the aforementioned filters 101a, 101b are such that the filter 101a allows components on a low-frequency side to pass through and the filter 101b allows components on a high-frequency side to pass through as shown in FIG. 10B, for example.

The filter portion 101 may also be configured such that the filter 101a allows components in an entire band shown in FIG. 10A to pass through and the filter 101b allows components on the low-frequency side or high-frequency side where an interfering wave is less likely to occur to pass through, for example. Furthermore, the filter portion 101 may be configured such that there are provided three filters including filters for passing the components on the low-frequency side and the high-frequency side in addition to a filter for passing the components in the entire band and these filters can be switched. In other words, the filter portion 101 should be configured to be able to extract components in at least part of the frequency band used by the radio signal RF. Moreover, the filter portion 101 may be configured such that the aforementioned filters 101a, 101b are disposed in series with each other and the aforementioned switching devices 101c, 101d bypass these filters 101a, 101b, respectively.

Responding to a pulse sensing signal SEN input from the pulse judgment portion 121a indicating whether the pulse judgment portion 121a is synchronized with received pulses, the gain controller 13 first determines a variance of the values A/D-converted by the A/D converter 5 during a period when no pulses are detected. The gain controller 13 then adjusts a frequency passband of the filter portion 101 by outputting the filter switching signal SEL according to the variance obtained by the gain controller 13.

FIGS. 11-15 are diagrams for explaining the aforementioned adjustment operation. FIG. 13A shows a relation between a frequency spectrum of the transmitted signal and a frequency spectrum of the interfering wave, the horizontal axis representing frequency and the vertical axis representing power. FIG. 13B shows frequency characteristics of the filters, the horizontal axis representing frequency. FIGS. 14A and 15A show transmitted signals, FIGS. 14B and 15B show received signals, FIGS. 14C and 15C show A/D-converted values, and FIGS. 14D and 15D show demodulated signals.

Figure 11:
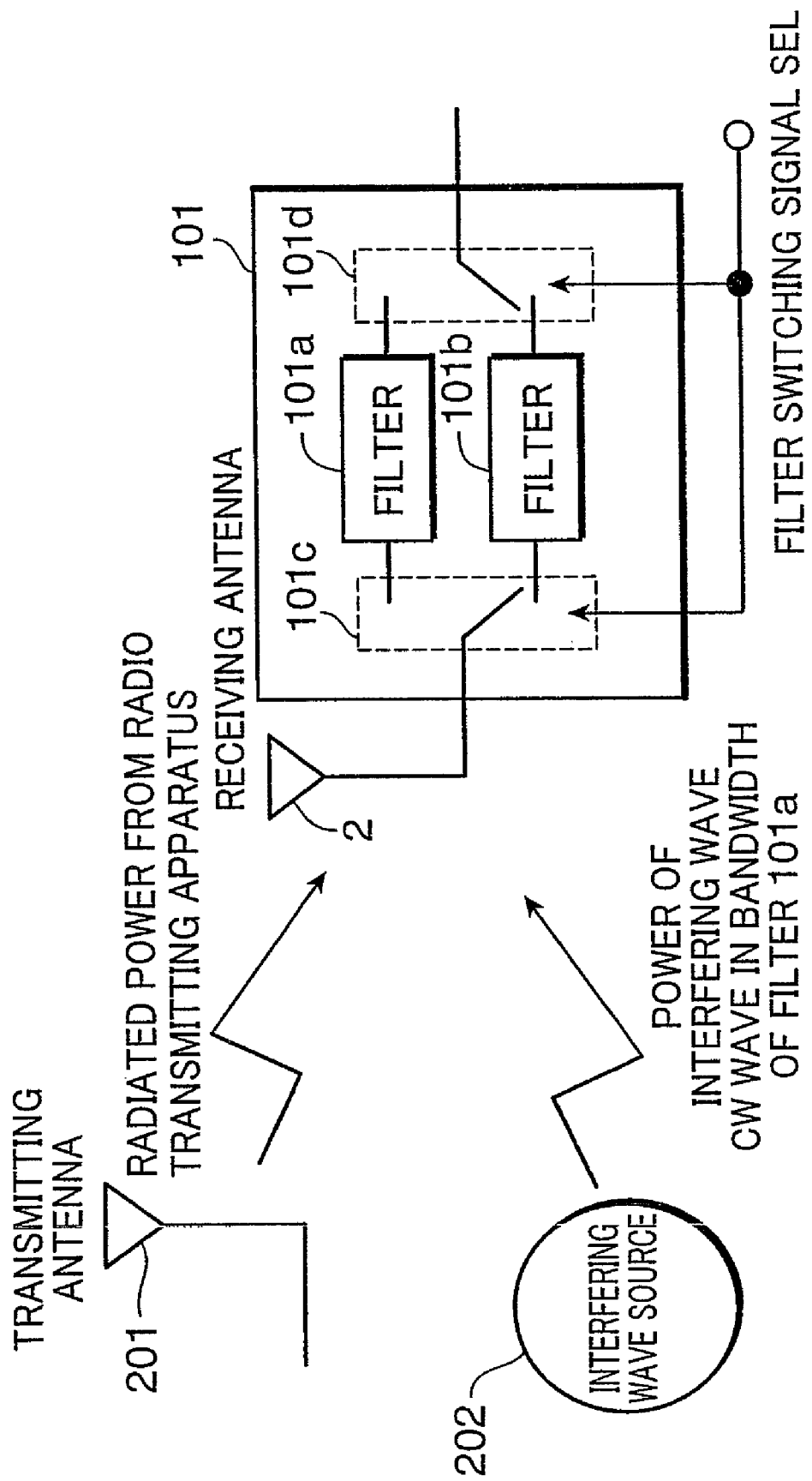
FIG. 11 is a diagram for explaining adjustment operation in a frequency passband of the filter portion.

This adjustment operation is now described. It is assumed that an interfering wave source 202 generates an interfering wave (noise) which becomes a CW wave in the filter 101a and contaminates the transmitted signal (radio signal RF) from a transmitting antenna 201 of the aforementioned radio transmitting apparatus as shown in FIG. 11, for example. Signal waveforms of the transmitted signal and the interfering wave that reach the receiving antenna 2 in this case are as shown in FIG. 12A and their frequency spectra are as shown in FIG. 13A, from top to bottom, respectively.

Therefore, if the filter portion 101 is configured with the low-frequency side filter 101a and the high-frequency side filter 101b as shown in FIG. 13B in the same fashion as mentioned in FIG. 10B, a combined wave of the transmitted signal and the interfering wave as shown in FIG. 12B passes through the low-frequency side filter 101a, so that the transmitted signal will be buried in the interfering wave when the interfering wave has a higher field strength than the transmitted signal. Thus, if there is a relationship expressed by (interfering wave)>>(transmitted signal) in terms of the field strength, only the interfering wave will be output. In this case, a signal output from the amplifier 102 after passing through the filter 101a of the filter portion 101 when the transmitted signal shown in FIG. 14A is input becomes as shown in FIG. 14B. For this reason, when the signal shown in FIG. 14B is detected by the detector 33 and integrated N times by the integrator 4 and the result of integration is converted by the A/D converter 5, most of A/D-converted values become equal to or larger than the aforementioned threshold TH as shown in FIG. 14C. As a result, the pulse judgment portion 121a of the demodulator 121 can not accomplish synchronization or obtain a demodulated signal as shown in FIG. 14D.

By contrast, the interfering wave is attenuated in the high-frequency side filter 101b as shown in FIG. 12C, so that it is possible to extract only the transmitted signal when the there is a relationship expressed by (transmitted signal)>>(interfering wave) in this frequency band in terms of the field strength. In this case, the signal output from the amplifier 102 after passing through the filter 101b of the filter portion 101 when the transmitted signal shown in FIG. 15A is input becomes as shown in FIG. 15B. For this reason, when the signal shown in FIG. 15B is detected by the detector 33 and integrated N times by the integrator 4 and the result of integration is converted by the A/D converter 5, components of A/D-converted values at the aforementioned phase point of +3 first become equal to or larger than the aforementioned threshold TH as shown in FIG. 15C. As a result, the pulse judgment portion 121a of the demodulator 121 can accomplish synchronization and obtain a demodulated signal corresponding to the transmitted signal from a succeedingly transmitted data train as shown in FIG. 15D.

The gain controller 13 may be configured to regularly select the filters 101a, 101b at alternate intervals of specific time periods and search through conditions of interfering waves in individual frequency bands to receive the signal by switching to one of the frequency bands containing less interfering waves. Alternatively, the gain controller 13 may be configured such that the same is switched to one filter when it becomes impossible to accomplish synchronization with the currently selected other filter.

The radio receiving apparatus 10 thus configured can demodulate the broadband radio signal to extract baseband components of the transmitted signal from components of a frequency band unburied in the interfering wave even when the level of the interfering wave is high and the transmitted signal is buried therein. With this arrangement, it is possible to enhance interfering wave withstand capability of the radio receiving apparatus 10 without causing a reduction in receiving sensitivity by avoiding a frequency region in which any interfering wave occurs when the interfering wave is present in the frequency band used by the radio signal RF. For this reason, the influence of noise is reduced, making it possible to further improve the reliability of communication.

Also, the amplifier 102 may be a variable-gain amplifier, in which gain of the amplifier 102 is adjusted by an amplification factor switching signal CTL fed from the gain controller 13. The gain controller 13 selects one of the filters 101a, 101b which makes the power of the interfering wave lower, or the variance smaller, when the two filters 101a, 101b are switched as mentioned above and it is judged that the variance, or the amount of variations, of the values A/D-converted in each case is equal to or larger than a specified level and the interfering wave exists in both cases and, in addition, the gain controller 13 switches the gain of the amplifier 102 to a smaller value as the variance becomes larger according to the amplification factor switching signal CTL.

Here, although received power is attributed to thermal noise when there is no signal received by the antenna 2, noise generated by the amplifier 102 is larger than the thermal noise. For this reason, the aforementioned A/D-converted value varies with time as shown in FIG. 16 due to self-generating noise of the amplifier 102, wherein the amount of variations of the A/D-converted value follows a Gaussian distribution.

On the other hand, it is assumed that a variance of the A/D-converted values obtained in a unit time W1 when there is no signal received by the antenna 2 is given in advance as an initial value. If an interfering wave occurs in this condition, the aforementioned variance increases according to the power level of the interfering wave as shown in a time W2 in FIG. 16. However, since the amplification factor of the amplifier 102 is decreased according to an increase in the variance upon switching to one of the filters 101a, 101b which passes lower power of the interfering wave (or to the frequency side which gives a better sensitivity) as mentioned above, the demodulator 121 sets the variance of the A/D-converted values to the initially set value shown in the time W1. Although the receiving sensitivity decreases due to the power of the interfering wave as a consequence, it becomes possible to accomplish synchronization and demodulate the signal if the transmitted signal having power equal to or higher than the power of the interfering wave is received even when the interfering wave is unavoidable, so that the radio receiving apparatus 10 for UWB communications can perform signal receiving operation in a stable fashion. Also, the radio receiving apparatus 10 can keep the level of reduction in the aforementioned receiving sensitivity to a minimum level corresponding to the power of the aforementioned interfering wave.

Furthermore, since the gain controller 13 determines the aforementioned variance during the period when no pulses are detected responding to the pulse sensing signal SEN fed from the pulse judgment portion 121a as mentioned earlier, it is possible to eliminate variations in the variance caused by variations in the A/D-converted value at the occurrence of transmitted pulses (φ3 regions in FIG. 8) and to exactly determine the variance of noise components, such as thermal noise and interfering waves, occurring during a period when the received signal is absent. As a result, it is possible to properly adjust the frequency passband of the filter portion 101 and the gain of the amplifier 102.

Figure 17:
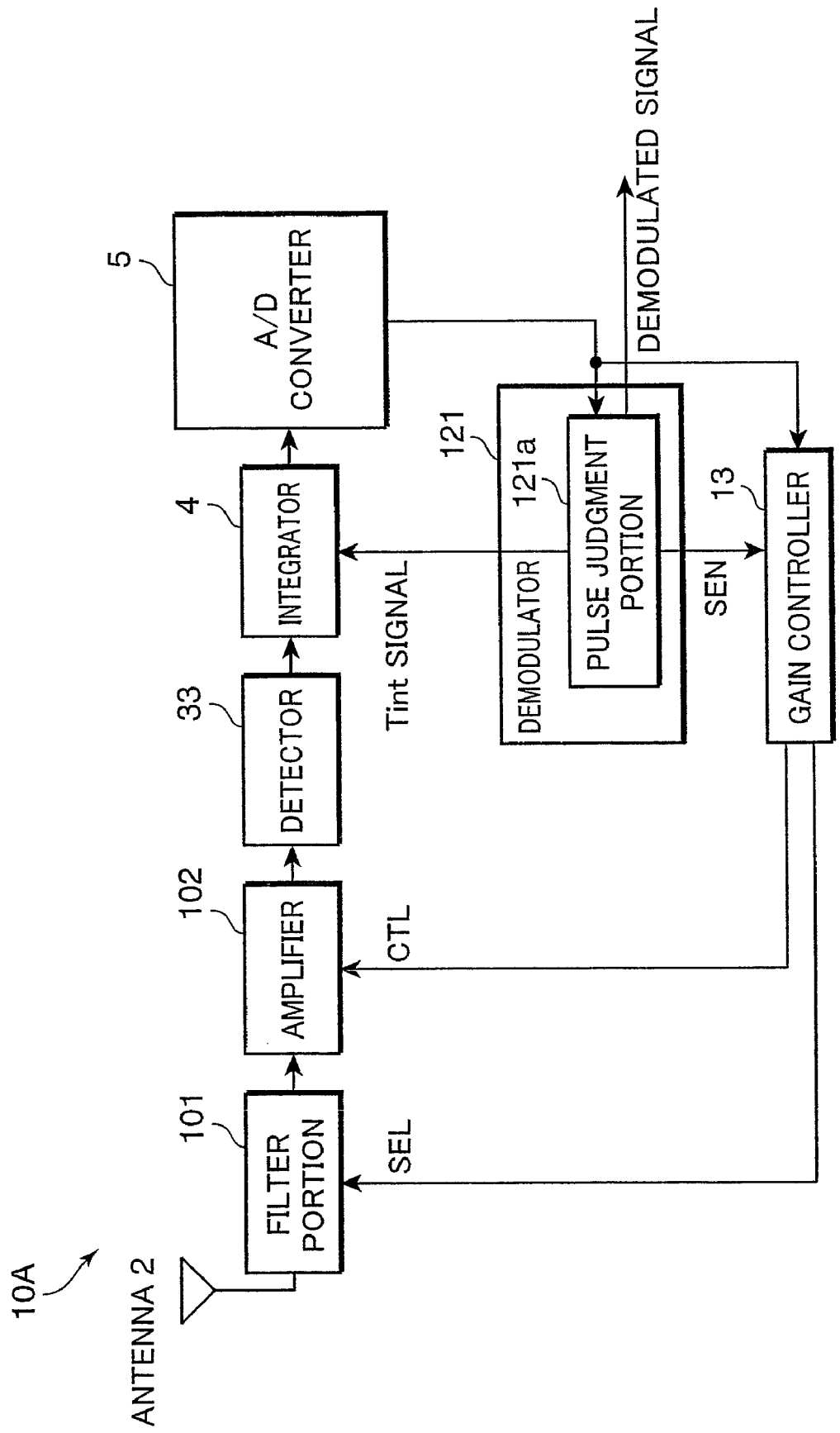
FIG. 17 is a block diagram showing the configuration of a radio receiving apparatus according to another embodiment of the invention.
Figure 18:
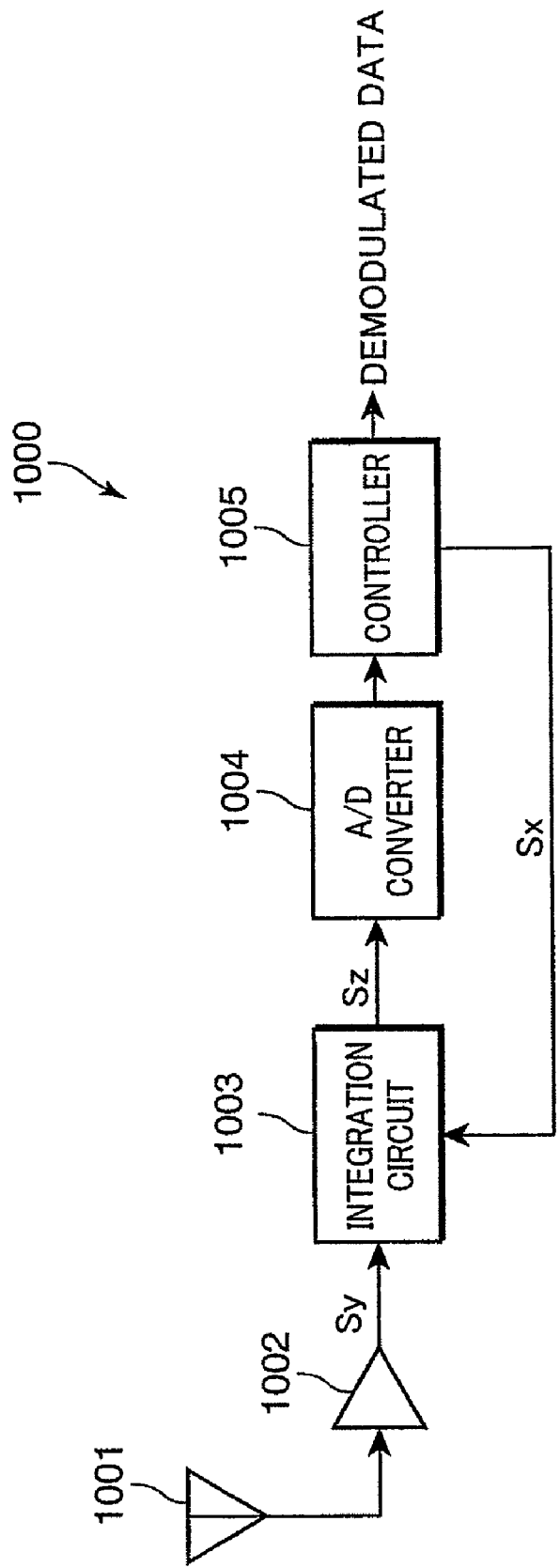
FIG. 18 is a block diagram showing a radio receiving apparatus for UWB communications according to the prior art.

FIG. 17 is a block diagram showing the configuration of a radio receiving apparatus according to another embodiment of the present invention.

While the radio receiving apparatus 10 in which the radio receiving apparatus 1 is provided with the filter portion 101, etc. has been described in the foregoing modified embodiment, the radio receiving apparatus 10 may be configured as a radio receiving apparatus 10A which receives a pulsating radio signal having a specific period with timing synchronized with this period and demodulates the received signal to extract a baseband signal from a pulse train of the radio signal, the radio receiving apparatus 10A comprising a filter portion 101 which can extract at least part of components in a frequency band used by the aforementioned radio signal with the received signal input into the filter portion 101, a detector 33 for detecting an envelope or peaks of an output of the aforementioned filter portion 101, an integrator 4 for accumulating an output of the aforementioned detector 33 for a specific integration period, an A/D converter 5 for A/D-converting an output voltage of the aforementioned integrator 4, a demodulator 121 for adjusting the integration period of the aforementioned detector 33 based on values A/D-converted by the aforementioned A/D converter and for performing demodulation to extract the aforementioned baseband signal, and a gain controller 13 for adjusting a frequency passband of the aforementioned filter portion 101 according to a variance of the values A/D-converted by the aforementioned A/D converter 5 as shown in FIG. 17. The radio receiving apparatus 10A may be configured to be further provided with an amplifier 102 connected between the filter portion 101 and the detector 33, so that gain of the amplifier 102 is adjusted by a signal fed from the gain controller 13. The radio receiving apparatus 10A thus configured can provide an enhanced interfering wave withstand capability without causing a reduction in receiving sensitivity by avoiding a frequency region in which any interfering wave occurs.

While the present Specification discloses various inventions as thus far discussed, principal ones of the inventions are summarized hereinbelow.

A radio receiving apparatus according to a first mode is for receiving a radio signal having pulsating signals occurring at specific periods, the radio receiving apparatus comprising a receiver portion for receiving the aforementioned radio signal, a regional level acquirer for acquiring a signal level obtained by the aforementioned receiver portion in each of plural regions into which each of the aforementioned periods is divided, a regional level storage for storing signal levels acquired by the aforementioned regional level acquirer in the aforementioned individual regions under conditions where the aforementioned radio signal is not received by the aforementioned receiver portion for the aforementioned individual regions, a corrector portion for correcting the signal levels in the aforementioned individual regions received by the aforementioned receiver portion based on the signal levels in the aforementioned individual regions stored in the aforementioned regional level storage, respectively, and a demodulator portion for demodulating the aforementioned radio signal according to the signal levels in the individual regions corrected by the aforementioned corrector portion.

According to this configuration, the radio signal having the pulsating signals occurring at the specific periods is received by the receiver portion and the signal levels of the radio signal obtained by the receiver portion are acquired individually for the plural regions into which each of pulse periods is divided. Then, the signal levels acquired in the individual regions under conditions where the radio signal is not received are stored in the regional level storage for the individual regions. Further, the signal levels in the individual regions received by the receiver portion are corrected based on the signal levels in the individual regions stored in the regional level storage, respectively, and the radio signal is demodulated according to the corrected signal levels in the individual regions. Thus, the influence of noise having periodicity is decreased by this correction, making it possible to improve reliability of communication.

A radio receiving apparatus according to a second mode is the radio receiving apparatus according to the aforementioned first mode, wherein the aforementioned regional level acquirer acquires the aforementioned signal levels in the aforementioned plural regions while successively offsetting the regions in which the aforementioned signal levels are acquired.

According to this configuration, the invention provides a radio receiving apparatus which decreases the influence of noise having periodicity and improves reliability of communication with the provision of the regional level acquirer which acquires the signal levels in the plural regions while successively offsetting the regions in which the aforementioned signal levels are acquired.

A radio receiving apparatus according to a third mode is the radio receiving apparatus according to the aforementioned first or second mode, wherein the aforementioned regional level acquirer acquires the signal levels in the aforementioned individual regions over the aforementioned plural periods, calculates average values of the signal levels thus acquired in time durations corresponding to the aforementioned individual regions in each of the aforementioned plural periods, and causes the aforementioned regional level storage to store the average values calculated for the individual time durations as the signal levels in the aforementioned individual regions.

According to this configuration, the average values in the individual time durations are regarded as the signal levels in the individual regions so that measurement accuracy of signal level values in individual window periods with periodic noise produced by internal circuits is improved. Thus, the reliability of communication is therefore improved.

A radio receiving apparatus according to a fourth mode is the radio receiving apparatus according to one of the aforementioned first to third modes, wherein the aforementioned corrector portion performs the aforementioned correction by subtracting the signal levels in the aforementioned individual regions stored in the aforementioned regional level storage from the signal levels in the aforementioned individual regions received by the aforementioned receiver portion, respectively.

According to this configuration, the invention provides a radio receiving apparatus which decreases the influence of noise having periodicity and improves reliability of communication with the provision of the corrector portion which performs the correction by subtracting the signal levels in the individual regions stored in the regional level storage from the signal levels in the individual regions received by the receiver portion, respectively.

A radio receiving apparatus according to a fifth mode is the radio receiving apparatus according to one of the aforementioned first to third modes, wherein the aforementioned corrector portion performs the aforementioned correction by adding differences between a preset reference value and the signal levels in the aforementioned individual regions stored in the aforementioned regional level storage to the signal levels in the aforementioned individual regions received by the aforementioned receiver portion, respectively.

According to this configuration, the signal corrected under conditions where no radio signal is received becomes approximately equal to the reference value. Therefore, the corrected signal takes a positive value even when demodulated pulses take a negative value, for example, so that it becomes unnecessary to process negative values and, thus, signal processing is facilitated.

A radio receiving apparatus according to a sixth mode is the radio receiving apparatus according to the aforementioned first mode, wherein the aforementioned regional level acquirer causes the aforementioned regional level storage to store differences between a preset reference value and the signal levels acquired in the aforementioned individual regions as signal levels in the aforementioned individual regions, and the aforementioned corrector portion performs the aforementioned correction by adding the signal levels in the aforementioned individual regions stored in the aforementioned regional level storage to the signal levels in the aforementioned individual regions received by the aforementioned receiver portion, respectively.

According to this configuration, the regional level acquirer causes the regional level storage to store the differences between the preset reference value and the signal levels acquired in the individual regions as the signal levels in the individual regions, so that it becomes possible to relieve the work load required for mathematical operation during reception of the radio signal.

A radio receiving apparatus according to a seventh mode is the radio receiving apparatus according to one of the aforementioned first to sixth modes, wherein the aforementioned receiver portion is provided with an antenna portion for receiving the aforementioned radio signal and outputting the received signal, a filter portion which can extract at least part of components in a frequency band used by the aforementioned radio signal with the received signal input into the filter portion, a detector portion for detecting one of an envelope and peaks of an output of the aforementioned filter portion, an integrator portion for accumulating an output of the aforementioned detector portion for a specific integration period, and an analog-to-digital converter for A/D-converting an output voltage of the aforementioned integrator portion, wherein the aforementioned demodulator portion adjusts the aforementioned integration period of the aforementioned integrator portion based on values A/D-converted by the aforementioned analog-to-digital converter, and the radio receiving apparatus further comprises a gain controller for adjusting for adjusting a frequency passband of the aforementioned filter portion according to a variance of the values A/D-converted by the aforementioned analog-to-digital converter.

According to this configuration, the components in the frequency band used by the radio signal are extracted from signal components received by a broadband antenna, for example, by the filter portion, and the envelope or peaks of the extracted components are detected by the detector portion. Then, the output of the detector portion is accumulated for the specific integration period by the integrator portion and the result of accumulation is A/D-converted by the analog-to-digital converter. A comparison between the values A/D-converted by the analog-to-digital converter and a specific threshold made by the demodulator portion makes it possible to judge the A/D-converted values as "1" or "0" data. The demodulator portion demodulates the "1" or "0" data obtained to extract a baseband signal therefrom and controls timing of the aforementioned integration period in such a way that a synchronizing pulse train will be detected when the synchronizing pulse train has not been detected.

The filter portion is configured to have a capability to extract at least part of the components in the frequency band used by the radio signal and the radio receiving apparatus is provided with the gain controller which adjusts the frequency passband of the filter portion according to the variance of the values A/D-converted by the analog-to-digital converter. In a case where the filter portion is configured to include a filter which passes components on a low-frequency side of the frequency passband used by the radio signal and a filter which passes components on a high-frequency side, for example, the filter portion is switched to the filter which passes the high-frequency side components when the filter which passes the low-frequency side components is currently selected and pulses are detected at other than a correct synchronization timing as a result of an increase in the variance, or the amount of variations, of the A/D-converted values caused by an interfering wave. Alternatively, in a case where the filter portion is configured to include a filter which passes components in the entire passband and a filter which passes components on the low-frequency side or high-frequency side, the filter portion is switched to the filter which passes the high-frequency side or high-frequency side components when the filter which passes the entire passband is currently selected and pulses are detected at other than a correct synchronization timing as a result of an increase in the variance of the A/D-converted values caused by an interfering wave, for example.

It is therefore possible to demodulate the broadband radio signal to extract baseband components of a transmitted signal from components of a frequency band unburied in the interfering wave even when the level of the interfering wave is high and the transmitted signal is buried therein. With this arrangement, it is possible to enhance interfering wave withstand capability of the radio receiving apparatus without causing a reduction in receiving sensitivity by avoiding a frequency region in which any interfering wave occurs when the interfering wave is present in the frequency band used by the radio signal. For this reason, the influence of noise is reduced, making it possible to further improve the reliability of communication.

A radio receiving apparatus according to an eighth mode is the radio receiving apparatus according to the aforementioned seventh mode, wherein the aforementioned receiver portion is further provided with an amplifier portion connected between the aforementioned filter portion and the detector portion, wherein gain of the aforementioned amplifier portion is adjusted by a signal fed from the aforementioned gain controller.

According to this configuration, the gain of the amplifier portion is reduced preferably after the frequency passband of the filter portion has been adjusted, and the radio receiving apparatus is controlled such that the variance of the A/D-converted values becomes approximately constant when the variance increases due to an interfering wave. Although the receiving sensitivity lowers as a consequence, it is possible to demodulate a received signal having a higher level than the interfering wave when such a signal is input. Therefore, the radio receiving apparatus can receive the radio signal if the received signal has power greater than power of the interfering wave even when the interfering wave is unavoidable.

A radio receiving apparatus according to a ninth mode is the radio receiving apparatus according to the aforementioned seventh or eighth mode, wherein the aforementioned gain controller judges whether any received signal exists from the variance of the values A/D-converted by the aforementioned analog-to-digital converter and restricts acquisition of the variance during the integration period in which the received signal exists.

According to this configuration, in adjusting the frequency passband of the filter portion upon judging that an interfering wave is occurring when the variance of the A/D-converted values increases as mentioned above, the gain controller judges whether any received signal exists from the variance and restricts acquisition of the variance during the integration period in which the received signal exists. This arrangement makes it possible to exactly determine the variance of noise components, such as thermal noise and interfering waves, occurring during a period when the received signal is absent and, as a result, it is possible to properly adjust the frequency passband of the filter portion and the gain of the amplifier portion.

A radio receiving method according to a tenth mode is for receiving a radio signal having pulsating signals occurring at specific periods, the radio receiving method comprising a step of receiving the aforementioned radio signal by a receiver portion, a step of acquiring a signal level obtained by the aforementioned receiver portion in each of plural regions into which each of the aforementioned periods is divided, a step of storing signal levels acquired in the aforementioned individual regions under conditions where the radio signal is not received by the aforementioned receiver portion in a regional level storage for the aforementioned individual regions, a step of correcting the aforementioned received signal levels in the aforementioned individual regions based on the signal levels in the aforementioned individual regions stored in the aforementioned regional level storage, respectively, and a step of demodulating the aforementioned radio signal according to the aforementioned corrected signal levels in the individual regions.

According to this configuration, the radio signal having the pulsating signals occurring at the specific periods is received by the receiver portion and the signal levels of the radio signal obtained by the receiver portion are acquired individually for the plural regions into which each of pulse periods is divided. Then, the signal levels acquired in the individual regions under conditions where the radio signal is not received are stored in the regional level storage for the individual regions. Further, the signal levels in the individual regions received by the receiver portion are corrected based on the signal levels in the individual regions stored in the regional level storage, respectively, and the radio signal is demodulated according to the corrected signal levels in the individual regions. Thus, the influence of noise having periodicity is decreased by this correction, making it possible to improve reliability of communication.

While the present invention has thus far been described properly and sufficiently through a discussion of specific embodiments with reference to the drawings to illustrate the invention, it should be recognized that modifications and/or improvements of the foregoing embodiments can easily be done by those skilled in the art. It is therefore construed that such modifications and/or improvements fall within metes and bounds of the claims as long as the modifications and/or improvements do not constitute a departure from the spirit and scope of the claims.

INDUSTRIAL APPLICABILITY

According to the present invention, which relates to a radio receiving apparatus and a radio receiving method for receiving an ultra-wideband communications radio signal, can provide a radio receiving apparatus and a radio receiving method which make it possible to improve reliability of communication.

The invention claimed is:

1. A radio receiving apparatus for receiving a radio signal having pulsating signals occurring at specific periods, said radio receiving apparatus comprising:
   a receiver for receiving the radio signal;
   a regional level acquirer for acquiring first signal levels, each obtained by said receiver in one of individual regions into which each of the specific periods is divided;
   a regional level storage for storing second signal levels acquired by said regional level acquirer in the individual regions under conditions where the radio signal is not received by said receiver for the individual regions;
   a corrector for correcting the first signal levels in the individual regions obtained by said receiver based on the second signal levels in the individual regions stored in said regional level storage, respectively; and
   a demodulator for demodulating the radio signal according to the first signal levels in the individual regions corrected by said corrector.

2. The radio receiving apparatus as recited in claim 1, wherein said regional level acquirer acquires the first signal levels in the individual regions while successively offsetting the individual regions in which the first signal levels are acquired.

3. The radio receiving apparatus as recited in claim 1, wherein said regional level acquirer acquires the first signal levels in the individual regions over the specific periods, calculates average values of the first signal levels thus acquired in time durations corresponding to the individual regions in each of the specific periods, and causes said regional level storage to store the average values calculated for the time durations as the second signal levels in the individual regions.

4. The radio receiving apparatus as recited in claim 1, wherein said corrector performs correction by subtracting the second signal levels in the individual regions stored in said regional level storage from the first signal levels in the individual regions obtained by said receiver, respectively.

5. The radio receiving apparatus as recited in claim 1, wherein said corrector performs correction by adding differences between a preset reference value and the second signal levels in the individual regions stored in said regional level storage to the first signal levels in the individual regions obtained by said receiver, respectively.

6. The radio receiving apparatus as recited in claim 1, wherein said regional level acquirer causes said regional level storage to store differences between a preset reference value and the first signal levels acquired in the individual regions as the second signal levels in the individual regions, and said corrector performs correction by adding the second signal levels in the individual regions stored in said regional level storage to the first signal levels in the individual regions obtained by said receiver, respectively.

7. The radio receiving apparatus as recited in claim 1, wherein said receiver comprises:
   an antenna for receiving the radio signal and outputting a received signal;
   a filter for extracting at least part of components in a frequency band used by the radio signal with a received signal input into said filter;
   a detector for detecting one of an envelope and peaks of an output of said filter;
   an integrator for accumulating an output of said detector for a specific integration period; and
   an analog-to-digital converter for A/D-converting an output voltage of said integrator;
   wherein said demodulator adjusts the specific integration period of said integrator based on values A/D-converted by said analog-to-digital converter; and said radio receiving apparatus further comprises a gain controller for adjusting a frequency passband of said filter according to a variance of the values A/D-converted by said analog-to-digital converter.

8. The radio receiving apparatus as recited in claim 7, wherein said receiver further comprises an amplifier connected between said filter and said detector, wherein a gain of said amplifier is adjusted by a signal fed from said gain controller.

9. The radio receiving apparatus as recited in claim 7, wherein said gain controller judges whether a received signal exists from the variance of the values A/D-converted by said analog-to-digital converter and restricts acquisition of the variance during the specific integration period in which the received signal exists.

10. A radio receiving method for receiving a radio signal having pulsating signals occurring at specific periods, said radio receiving method comprising:

receiving the radio signal by a receiver;

acquiring first signal levels, each obtained by the receiver in one of individual regions into which each of the specific periods is divided;

storing second signal levels acquired in the individual regions under conditions where the radio signal is not received by the receiver in a regional level storage for the individual regions;

correcting the first signal levels in the individual regions based on the second signal levels stored in the regional level storage, respectively; and demodulating the radio signal according to the corrected first signal levels in the individual regions.

* * * * *